(12) United States Patent  
Kotani

(10) Patent No.: US 8,576,306 B2
(45) Date of Patent: Nov. 5, 2013

(54) IMAGE SENSING APPARATUS, IMAGE PROCESSING APPARATUS, CONTROL METHOD, AND COMPUTER-READABLE MEDIUM

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 12/813,047

(22) Filed: Jun. 10, 2010

(65) Prior Publication Data

US 2011/0001837 A1 Jan. 6, 2011

(30) Foreign Application Priority Data

Jul. 3, 2009 (JP) ................................. 2009-159123

(51) Int. Cl.
*H04N 5/217* (2011.01)

(52) U.S. Cl.
USPC .................. 348/241; 348/208.99; 348/207.99

(58) Field of Classification Search
USPC .......... 348/208.99–208.6, 222.1, 207.99, 241
See application file for complete search history.

(56) References Cited

U.S. PATENT DOCUMENTS

| 7,433,079 | B2 | 10/2008 | Kotani | |
|---|---|---|---|---|
| 7,548,247 | B2 | 6/2009 | Kotani | |
| 7,580,071 | B2 | 8/2009 | Uchiyama | |
| 7,619,666 | B2 | 11/2009 | Kotani | |
| 7,728,849 | B2 | 6/2010 | Kotani | |
| 7,940,306 | B2 * | 5/2011 | Okumura et al. | 348/208.12 |
| 2006/0115177 | A1 | 6/2006 | Ishiga | |
| 2008/0025636 | A1 | 1/2008 | Kotani | |
| 2008/0025650 | A1 | 1/2008 | Kotani | |
| 2008/0151065 | A1 * | 6/2008 | Okumura et al. | 348/208.4 |
| 2009/0295935 | A1 | 12/2009 | Uchiyama | |
| 2009/0303339 | A1 * | 12/2009 | Kudo et al. | 348/222.1 |
| 2010/0092103 | A1 | 4/2010 | Ishiga | |

FOREIGN PATENT DOCUMENTS

| JP | 2001-223894 | 8/2001 |
|---|---|---|
| JP | 2004-222231 | 8/2004 |
| JP | 2005-072629 | 3/2005 |

\* cited by examiner

*Primary Examiner* — Tuan Ho

(74) *Attorney, Agent, or Firm* — Fitzpatrick, Cella, Harper & Scinto

(57) ABSTRACT

An image sensing apparatus having a camera shake correction function of moving an optical axis of an image sensing device, the apparatus comprises an optical axis moving amount acquisition unit configured to acquire a moving amount of the optical axis at the time of shooting; a dust pixel determination unit configured to scan image data acquired by pre-shooting, during which the camera shake correction function is disabled, and determine a dust pixel corresponding to dust that is adhered to the image sensing device; a dust correction data generation unit configured to generate dust correction data based on information about the dust pixel that has been determined by the dust pixel determination unit; and a holding unit configured to hold the moving amount of the optical axis acquired by the optical axis moving amount acquisition unit and the dust correction data generated by the dust correction data generation unit.

17 Claims, 19 Drawing Sheets

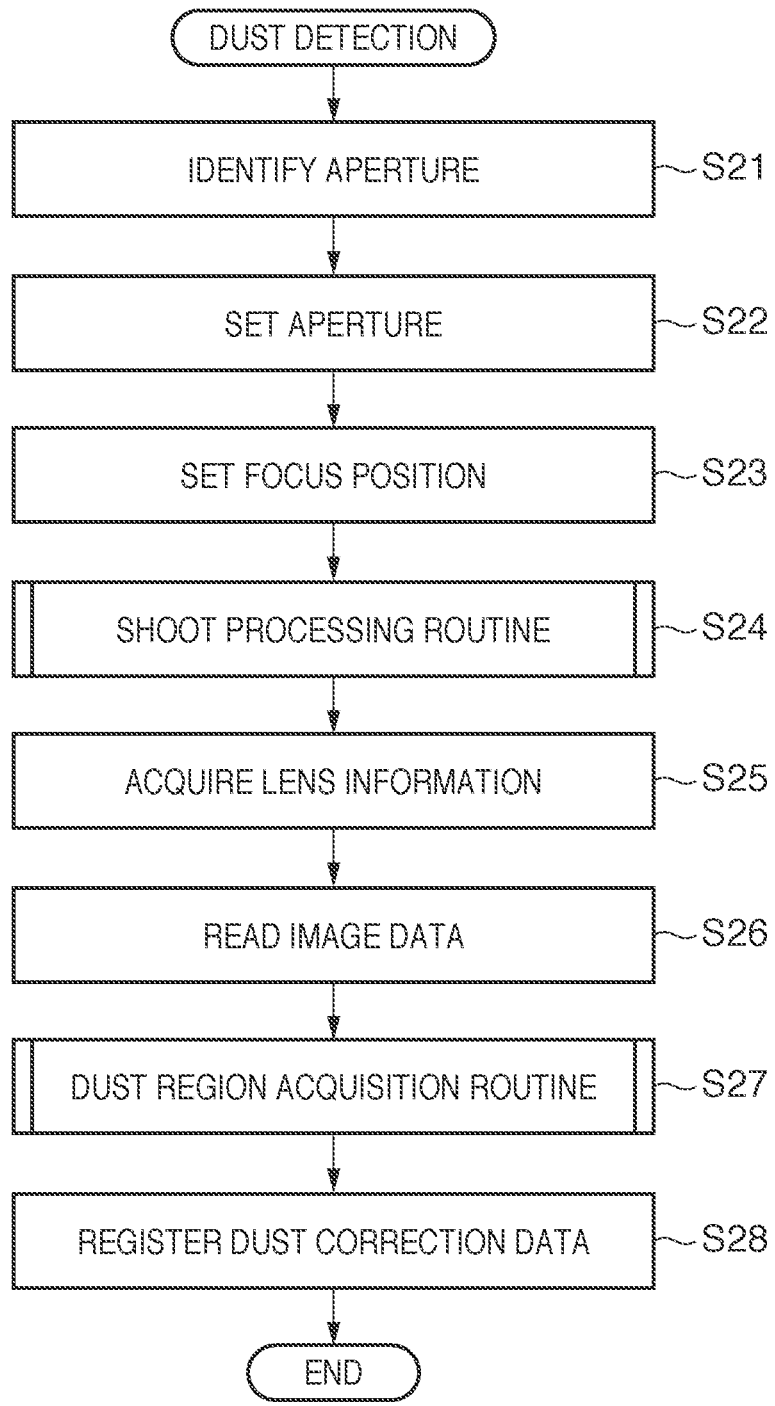

FIG. 4

| ADDRESS OFFSET (Hex) | CODE (Hex) | MEANING |
|---|---|---|
| +00 | FF | Prefix |
| +01 | E0 | |
| +02 | | F VALUE (NUMERATOR) |
| +04 | | F VALUE (DENOMINATOR) |
| +06 | | PUPIL POSITION (NUMERATOR) |
| +08 | | PUPIL POSITION (DENOMINATOR) |
| +0A | | NUMBER OF DUST REGIONS |
| +0C | | PARAMETERS OF DUST REGION $D_1$<br>   RADIUS (2 BYTES)<br>   CENTER X COORDINATE (2 BYTES)<br>   CENTER Y COORDINATE (2 BYTES) |
| | | PARAMETERS OF DUST REGION $D_2$ |
| | | ... |
| | | PARAMETERS OF DUST REGION $D_n$ |

FIG. 14

| ADDRESS OFFSET (Hex) | CODE (Hex) | MEANING |
|---|---|---|
| +00 | | PROCESSING ID |
| +02 | | APPLICATION RANGE<br>   RADIUS (2 BYTES)<br>     CENTER X COORDINATE (2 BYTES)<br>     CENTER Y COORDINATE (2 BYTES) |
| +08 | | RELATIVE POSITIONS<br>FROM COPY SOURCE<br>TO COPY DESTINATION<br>   X DIRECTION (2 BYTES)<br>   Y DIRECTION (2 BYTES) |
| +06 | | POINTER TO DIFFERENTIAL IMAGE |

TRAJECTORY OF
MOVED OPTICAL AXIS

MOVING RANGE MR OF
OPTICAL AXIS

CENTER OF GRAVITY MD OF
MOVED OPTICAL AXIS

PERIPHERAL REGION N

CENTRAL REGION C

FIG. 23

```
REFLECTION OF MOVING
AMOUNT OF OPTICAL AXIS
        │
        ▼
SET TEMPORARY CENTRAL REGION ─── S2601
        │
        ▼
SET TEMPORARY PERIPHERAL REGION ─── S2602
        │
        ▼
SET POINTS USED
FOR CONVERSION PROCESSING ─── S2603
        │
        ▼
CONVERT POINTS IN TEMPORARY
CENTRAL REGION ─── S2604
        │
        ▼
CONVERT POINTS IN TEMPORARY
PERIPHERAL REGION ─── S2605
        │
        ▼
DETERMINE POST-CONVERSION REGIONS ─── S2606
        │
        ▼
       END
```

FIG. 24

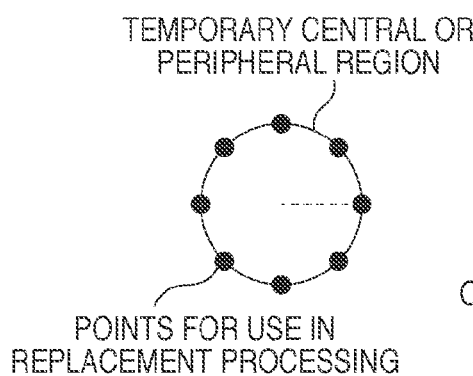

TEMPORARY CENTRAL OR PERIPHERAL REGION

POINTS FOR USE IN REPLACEMENT PROCESSING

FIG. 25

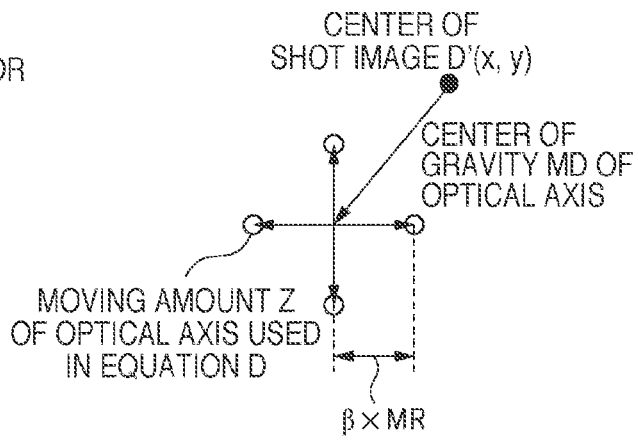

CENTER OF SHOT IMAGE D'(x, y)

CENTER OF GRAVITY MD OF OPTICAL AXIS

MOVING AMOUNT Z OF OPTICAL AXIS USED IN EQUATION D $\beta \times MR$

IMAGE SENSING APPARATUS, IMAGE PROCESSING APPARATUS, CONTROL METHOD, AND COMPUTER-READABLE MEDIUM

BACKGROUND OF THE INVENTION

1. Field of the Invention

The present invention relates to an image sensing apparatus using image sensors such as CCDs or CMOS sensors, an image processing apparatus, a control method, and a computer-readable medium.

2. Description of the Related Art

In recent years, many image sensing apparatus are available on the market, such as digital cameras and digital video cameras that generate image signals with image sensors, such as CCDs, and record generated image signals as data. However, in digital cameras, foreign substances such as dust and dirt (hereinafter simply referred to as "dust") may adhere to the image sensor, the surface of image-sensor cover glass or an optical filter, for example, that is fixed to the image sensor, or optical systems (hereinafter collectively referred to as "image-sensor optical components"). Such adherence of dust to image-sensor optical components causes the problem where the quality of shot images degrades, such as a case where light is blocked by dust, resulting in a portion that is not shot. Particularly, lens-exchangeable digital cameras have the problem whereby dust can easily enter the camera when lenses are exchanged.

Such dust on an image sensor usually adheres not to the surface of the image sensor but to the surface of the cover glass or an optical filter and, accordingly, images are formed in different states depending on the aperture value of the shooting lens and the distance from the pupil position. In other words, a lens at almost full aperture causes blurring and is thus little affected by adherence of minute dust, whereas a lens with a high aperture value, in contrast, forms clear images and is thus influenced by adherence of minute dust.

Thus, a method for obscuring dust is known in which an image that captures only dust on the image sensor is prepared in advance by, for example, shooting a white wall with a small lens aperture, and is used in combination with an ordinary shot image (see Japanese Patent Laid-Open No. 2004-222231). With this method, however, the user always needs to be aware of the association between the image that was shot for dust detection and related real shot images. A conceivable example is that dust positions are acquired by shooting a white wall, for example, and then held in the digital camera so that a list of dust positions and sizes are attached to image data that is obtained by ordinary shooting. For example, a separate image processing apparatus may be prepared and used to analyze dust positions in image data based on attached dust positions and to correct analyzed regions with surrounding pixels, thereby obscuring dust.

Another known method is analyzing multiple shot images and identifying unchanged minute regions as dust regions (see Japanese Patent Laid-Open No. 2005-72629).

Aside from the above-described dust problem, another problem also arises that, since image data obtained by a digital camera is easily displayed at different magnifications on computers, camera shake is getting more noticeable with year-over-year accelerating reductions in pixel pitches of image sensors. In conjunction with this, lens- or sensor-shift optical camera shake correction systems are becoming increasingly popular, but in cases where shooting is performed while applying optical camera shake correction, the optical axis will shift at every shooting. Thus, shot dust positions are not always constant. In addition, since the direction and speed of camera shake minutely vary during exposure, it is difficult to take into account the proper amount of optical axis shift even though the amount of camera shake is stored at the instant when the shutter is released, for example. The aforementioned conventional dust reduction processing accordingly does not include approaches to cases where the optical axis shifts during exposure and does not solve the problems satisfactorily.

SUMMARY OF THE INVENTION

The present invention has been made in view of the above-described problems and allows the influence of dust on shot images to be reduced in cases where dust adheres to an image sensor or to a cover filter, for example, that is fixed to the image sensor, even if shooting is performed while a camera shake correction function of moving an optical axis is enabled.

According to one aspect of the present invention, there is provided an image sensing apparatus having a camera shake correction function of moving an optical axis of an image sensing device, the apparatus comprising: an optical axis moving amount acquisition unit configured to acquire a moving amount of the optical axis at the time of shooting; a dust pixel determination unit configured to scan image data acquired by pre-shooting, during which the camera shake correction function is disabled, and determine a dust pixel corresponding to dust that is adhered to the image sensing device; a dust correction data generation unit configured to generate dust correction data based on information about the dust pixel that has been determined by the dust pixel determination unit; and a holding unit configured to hold the moving amount of the optical axis acquired by the optical axis moving amount acquisition unit and the dust correction data generated by the dust correction data generation unit, wherein the optical axis moving amount acquisition unit acquires a moving amount that is a difference in position between the optical axis at the time of pre-shooting and the optical axis at the time of ordinary shooting, during which the camera shake correction function is enabled, and the holding unit holds the moving amount of the optical axis and image data at the time of ordinary shooting in association with each other.

According to the present invention, image data is acquired with consideration given to the moving amount of the optical axis at the time of optical camera shake correction, even in cases where dust adheres to the image sensor or to cover glass or a filter, for example, that is fixed to the image sensor. Applying such acquired data to subsequent image processing allows the influence of dust on shot images to be reduced.

Further features of the present invention will become apparent from the following description of exemplary embodiments with reference to the attached drawings.

BRIEF DESCRIPTION OF THE DRAWINGS

FIG. 3 is a flowchart showing a process of detecting dust according to the embodiment.

FIG. 4 illustrates an example data structure at the time of pre-shooting according to the embodiment.

FIG. 14 illustrates an example data structure of edit histories at the time of image editing according to the embodiment.

FIG. 23 is a flowchart relating to a process of reflecting moving amounts of an optical axis according to the first embodiment.

FIG. 24 is a diagram explaining a process of converting a region that is subjected to repair processing according to a second embodiment.

FIG. 25 is a diagram explaining a process of converting a region that is subjected to repair processing according to the second embodiment.

DESCRIPTION OF THE EMBODIMENTS

Hereinafter, embodiments of the present invention will be described in detail with reference to the drawings.

First Embodiment

In the present embodiment, a camera body detects dust adhering to its image sensing device, generates dust correction data, and attaches the dust correction data to image data. Thereafter, an image processing apparatus outside the camera performs a process of reducing dust from image data based on the dust correction data attached to the image data. This primary processing will be described below.

Figure 1:
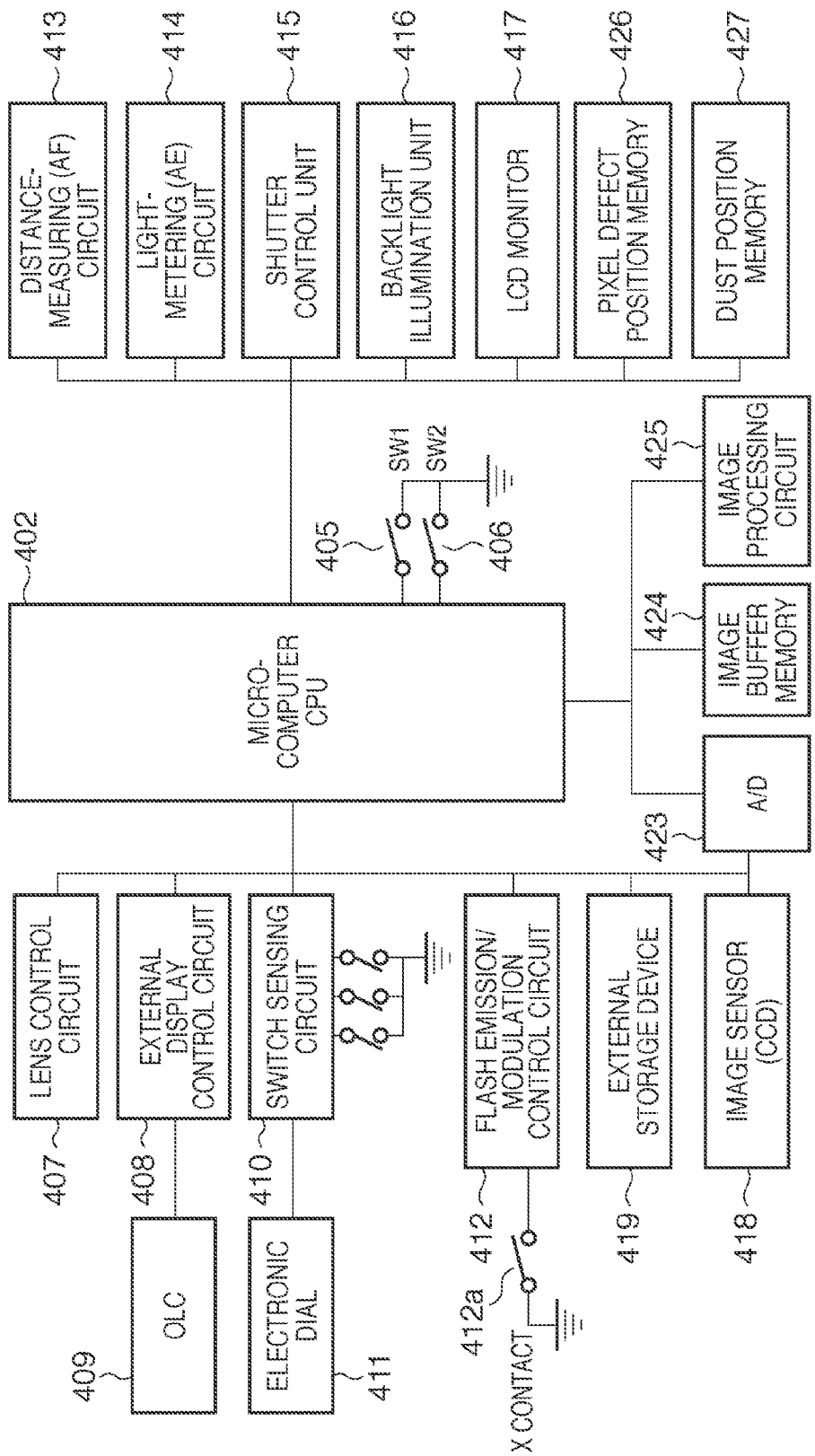
FIG. 1 illustrates an example internal configuration of an image sensing apparatus according to an embodiment of the present invention.

FIG. 1 is a block diagram illustrating a circuit configuration of a lens-exchangeable single-lens reflex digital camera as an image sensing apparatus according to a first embodiment of the present invention. In FIG. 1, a microcomputer CPU 402 controls operations of the whole camera, such as processing image data that is output from an image sensor (in the present embodiment, a CCD) 418 or controlling display of an LCD monitor 417. A switch (SW1) 405 is turned on by pressing a release button 114 halfway down (see FIG. 2A), and the digital camera of the present embodiment becomes ready for shooting at the turn-on of the switch (SW1) 405. A switch (SW2) 406 is turned on by pressing the release button 114 all the way down (full-pressed state), and the digital camera of the present embodiment starts shooting operations at the turn-on of the switch (SW2) 406. A lens control circuit 407 communicates with a shooting lens 200 (see FIG. 2B) and controls movements of the shooting lens 200 or of aperture blades at the time of auto focusing (AF).

Referring again to FIG. 1, an external display control circuit 408 controls an external display device (OLC) 409 or a display device (not shown) inside a viewfinder. A switch sensing circuit 410 transmits signals from multiple switches, including an electronic dial 411 provided in the camera, to the microcomputer CPU 402. A flash emission/modulation control circuit 412 is grounded via an X contact 412a and controls an external flash. A distance-measuring (AF) circuit 413 detects the defocus amount of a subject for AF. A light-metering (AE) circuit 414 measures the luminance of a subject. A shutter control circuit 415 controls the shutter so as to perform proper exposure on the image sensor. The LCD monitor 417 and a backlight illumination device 416 constitute an image display device. An external storage device 419 is, for example, a hard disk drive (HDD) or semiconductor memory card that is detachable from the camera body.

The microcomputer CPU 402 is also connected to an A/D converter 423, an image buffer memory 424, an image processing circuit 425 that includes a DSP for example, and a pixel-defect position memory 426 that stores information indicating that given pixels themselves are defective in the image sensor. The microcomputer CPU 402 is also connected to a dust position memory 427 that stores pixel positions in the image sensor where dust results in poor imaging. The pixel-defect position memory 426 and the dust position memory 427 may be nonvolatile memories. Alternatively, the pixel-defect position memory 426 and the dust position memory 427 may store information using different addresses in a common memory space. Programs executed by the microcomputer CPU 402 (for example, a program for executing the procedure of FIG. 3) are stored in a nonvolatile memory. Alternatively the programs may be stored in the dust position memory 427 or the pixel-defect position memory 426.

Figure 2A:
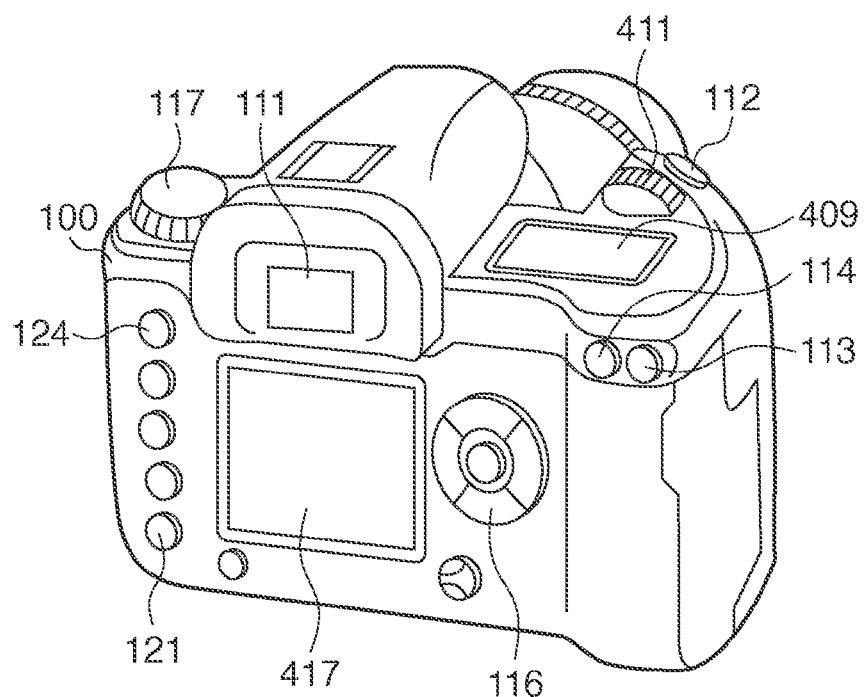
FIGS. 2A and 2B illustrate an example of the image sensing apparatus according to the embodiment.
Figure 2B:
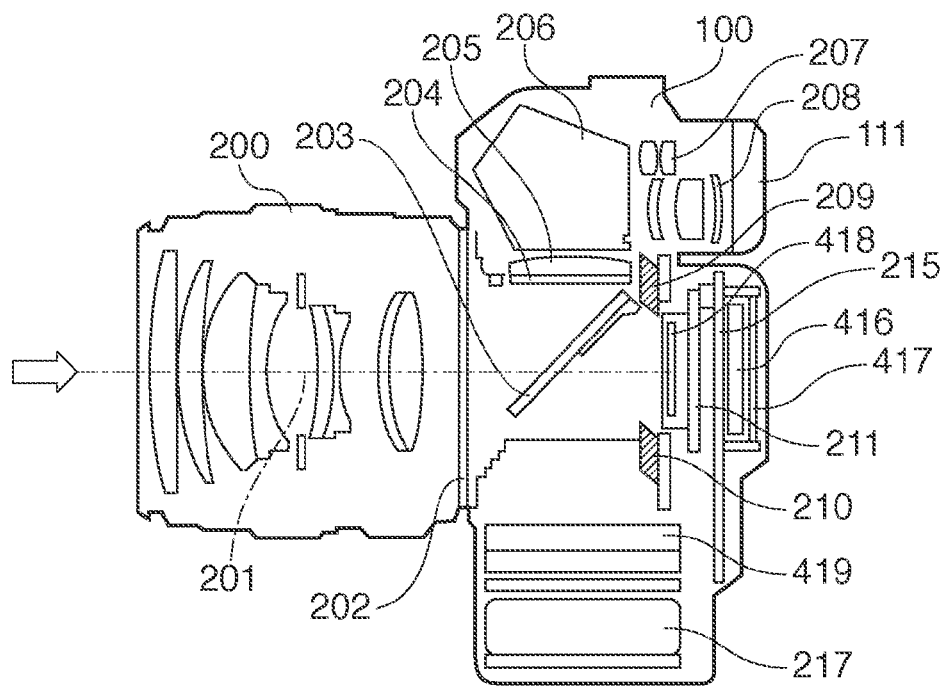

FIG. 2A is a perspective view illustrating the outer appearance of the digital camera according to the present embodiment, and FIG. 2B is a vertical cross-sectional view of FIG. 2A. In FIG. 2A, a camera body 100 is provided on its upper side with an eyepiece window 111 for viewfinder observation, an auto-exposure (AE) locking button 112, an AF distance-measuring point selection button 113, and the release button 114 for executing shooting operations. The electronic dial 411, a shooting-mode selection dial 117, and the external display device 409 are also provided. The electronic dial 411 is a multi-function signal input device for inputting numerical values to the camera with the combined use of other operation buttons and for switching shooting modes. The external display device 409 includes a liquid crystal display (not shown)

that displays shooting conditions such as shutter speed, aperture, and shooting modes and other information.

The camera body 100 is also provided on its rear side with the LCD monitor 417 for displaying shot images and various setting screens, a monitor switch 121 that is used to turn on and off the LCD monitor 417, a cross switch 116, and a menu button 124. The cross switch 116 includes four (up, down, left, and right) buttons and a center "SET" button that are used by the user to issue instructions to the camera, such as selecting or executing menu items displayed on the LCD monitor 417. The menu button 124 is used to cause the LCD monitor 417 to display a menu screen for making various camera settings. For example, when selecting and setting a shooting mode, the user presses the menu button 124 and then operates the up, down, left, and right buttons of the cross switch 116 to select the desired mode, and presses the "SET" button to complete the setting. The menu button 124 and the cross switch 116 are also used to set a dust mode, which will be described later, and to set a display mode and an identification mark in the dust mode.

Since the LCD monitor 417 of the present embodiment is transmissive, driving the LCD monitor 417 is not enough to allow visual recognition of images, and the backlight illumination device 416 always needs to be provided on the rear side of the LCD monitor 417 as illustrated in FIG. 2B. As described above, the LCD monitor 417 and the backlight illumination device 416 constitute an image display device.

As illustrated in FIG. 2B, the shooting lens 200 in the shooting optical system is detachable from the camera body 100 via a lens mount 202. FIG. 2B shows a shooting optical axis 201 and a quick return mirror 203. The quick return mirror 203 is placed in a shooting optical path and is movable between a position at which it guides subject light from the shooting lens 200 to the viewfinder optical system (the position illustrated in FIG. 2B, which is hereinafter referred to as an "inclined position") and a retracted position (not shown) out of the shooting optical path.

In FIG. 2B, the quick return mirror 203 guides subject light to the viewfinder optical system so that images are formed on a focusing plate 204. A condensing lens 205 is provided to improve visibility with the viewfinder, and a penta dach prism 206 guides subject light that passed through the focusing plate 204 and the condensing lens 205 to an eyepiece 208 for use in viewfinder observation and to a light-metering sensor 207. Opening a rear curtain 209 and a front curtain 210 that constitute a shutter allows the image sensor 418, which is a solid-state image sensor placed on the rear side, to be exposed for a required period of time. A shot image that has been converted by the image sensor into electric signals pixel by pixel is processed by the A/D converter 423 and the image processing circuit 425, for example, and recorded as image data into the external storage device 419. The image sensor 418 is held on a printed circuit board 211. Another printed circuit board, namely a display board 215, is placed behind the printed circuit board 211. The display board 215 is provided with the LCD monitor 417 and the backlight illumination device 416 on its surface that is opposite the side where the printed circuit board 211 is placed. The external storage device 419 records image data, and a battery (portable power supply) 217 supplies power thereto. The external storage device 419 and the battery 217 are detachable from the camera body. Moreover, in the present embodiment, the image sensor 418 is provided on its exposed surface side with a filter that covers the exposed surface. This filter has a certain thickness and serves as a cover filter or low-pass filter (hereinafter referred to as "LPF"). Thus, dust adhering to the image sensor 418 actually adheres to the filter surface that is spaced a certain distance from the surface of the image sensor 418.

Dust Detection Processing

FIG. 3 is a flowchart explaining a process of detecting dust in a digital camera according to the present embodiment (that is, a process of detecting pixel positions where dust causes poor imaging). The processing is implemented by the microcomputer CPU 402 executing a process program for detecting dust stored in the dust position memory 427. The dust detection processing is performed by shooting an image for use in dust detection. Shooting such an image for use in dust detection is hereinafter referred to as pre-shooting. On the other hand, ordinary shooting operations are referred to as ordinary shooting. In pre-shooting, preparations for dust detection are made by placing the camera with the shooting optical axis 201 of the shooting lens 200 being directed to an exit surface of a surface illuminating device or to a plane of uniform color such as a white wall. Alternatively, preparations for dust detection may be made by mounting a light unit for use in dust detection (a compact point-light source device mounted instead of a lens (not shown)) on the lens mount 202 of the camera body. A conceivable example of a light source of the light unit is a white LED, and it is desirable that the size of a light emitting surface may be adjusted so as to be equivalent to a predetermined aperture value (for example, F64 in the present embodiment).

Figure 16:
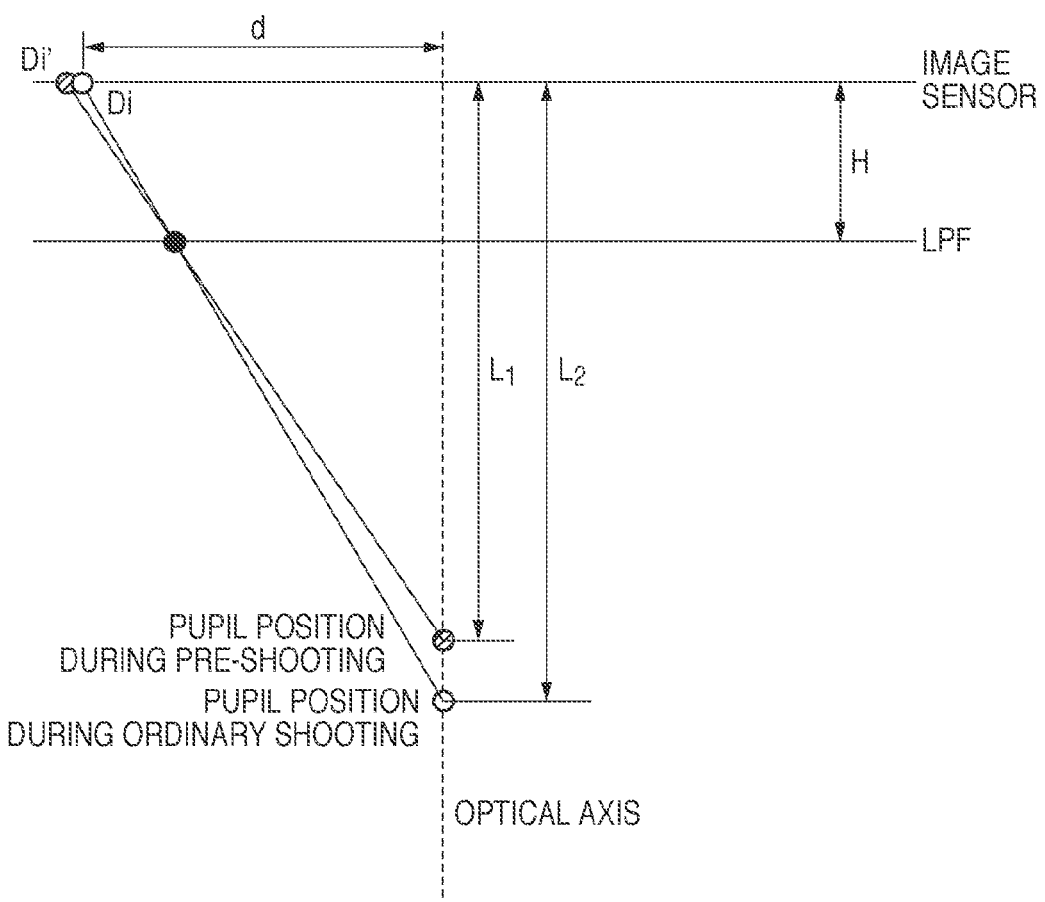
FIG. 16 is a diagram explaining changes in shooting position that accompany changes in pupil position according to the embodiment.

While the present embodiment describes a case of using an ordinary shooting lens, the abovementioned light unit may be mounted on the lens mount 202 and used for dust detection. As described above, images for use in dust detection according to the present embodiment are images with uniform color. After the preparations are completed, for example upon an instruction from the cross switch 116 to start pre-shooting being given, the microcomputer CPU 402 first specifies an aperture (S21). Dust in the vicinity of the image sensor forms different images depending on the aperture value of the lens, and dust positions vary depending on the pupil position of the lens as illustrated in FIG. 16. Thus, dust correction data needs to include, in addition to dust positions and sizes, the aperture value and pupil position of the lens at the time of detection. However, if it is predetermined at the time of generating the dust correction data that the same aperture value is always used regardless of the use of different lenses, the dust correction data does not always need to include the aperture value. Similarly, the dust correction data does not always need to include the pupil position if a light unit is used or only the use of specific lenses is allowed. In other words, it can be said that the dust correction data needs to include the aperture value and pupil position of the lens at the time of detection in cases where the use of multiple lenses is allowed or the aperture value to be used is changed as appropriate at the stage of generating the dust correction data by pre-shooting. The pupil position as used herein refers to a distance of an exit pupil from the imaging plane (focal plane). In the present embodiment, the aperture value is specified as F16, for example.

Then, the microcomputer CPU 402 causes the lens control circuit 407 to control the aperture blades of the shooting lens 200, thereby setting the aperture to the aperture value specified in S21 (S22). Moreover, a focus position is set to infinity (S23). After the aperture value and focus position of the shooting lens have been set, pre-shooting is performed (S24). Details of a shoot processing routine performed in S24 will be described later with reference to FIG. 8. Shot image data is stored into the image buffer memory 424.

After completion of the pre-shooting, the aperture value and the pupil position at the time of shooting are acquired (S25). The image processing circuit 425 retrieves data that is stored in the image buffer memory 424 and that corresponds to pixels in the shot image (S26). The image processing circuit 425 performs processing shown in FIG. 5 to acquire pixel positions where dust exists and dust sizes (S27). The pixel positions where dust exists and the dust sizes, which have been acquired in S27, and information including the aperture value and the pupil position, which have been acquired in S25, are registered in the dust position memory 427 (S28). Here, if the aforementioned light unit is used, lens information cannot be acquired. Thus, in such cases where lens information cannot be acquired, it is determined that the light unit has been used, and predetermined pupil-position information and a converted aperture value that is calculated from the diameter of a light source of the light unit are registered. Then, in S28, the positions of the retrieved pixels and the positions of defective pixels (pixel defects) that have been pre-recorded in the pixel defect position memory 426 since the time of manufacture are compared so as to determine whether or not the pixels are defective. Then, only such regions that have been determined as not being due to pixel defects may be registered into the dust position memory 427.

FIG. 4 illustrates an example data format of the dust correction data stored in the dust position memory 427. As illustrated in FIG. 4, the dust correction data includes lens information at the time of pre-shooting and information about dust positions and sizes. This dust correction data is attached at the time of ordinary shooting to images, together with image data information at the time of shooting, and is used for dust reduction processing, which will be described later. Specifically, an actual aperture value (F value) and an actual pupil position at the time of pre-shooting are stored as lens information at the time of pre-shooting. Then, the number (integer) of detected dust regions is stored into a subsequent storage area and, following this, individual specific parameters of the dust regions are repeatedly stored a number of times equal to the number of dust regions. The parameters of the dust regions each are a set of three numerical values including the radius of dust (for example, 2 bytes), the x coordinate of the center of a valid image region (for example, 2 bytes), and the y coordinate of the center (for example, 2 bytes). In cases where a limitation is put on the size of the dust correction data due to a reason such as the size of the dust position memory 427, data is stored with priority given in the order in which the dust regions were acquired in S27. This is because, in the dust region acquisition routine in S27, dust regions are sorted in order of decreasing noticeability of dust as will be described later.

Dust Region Acquisition Routine

Next, the details of the dust region acquisition routine performed in S27 will be described with reference to FIGS. 5 to 7.

Figure 6:
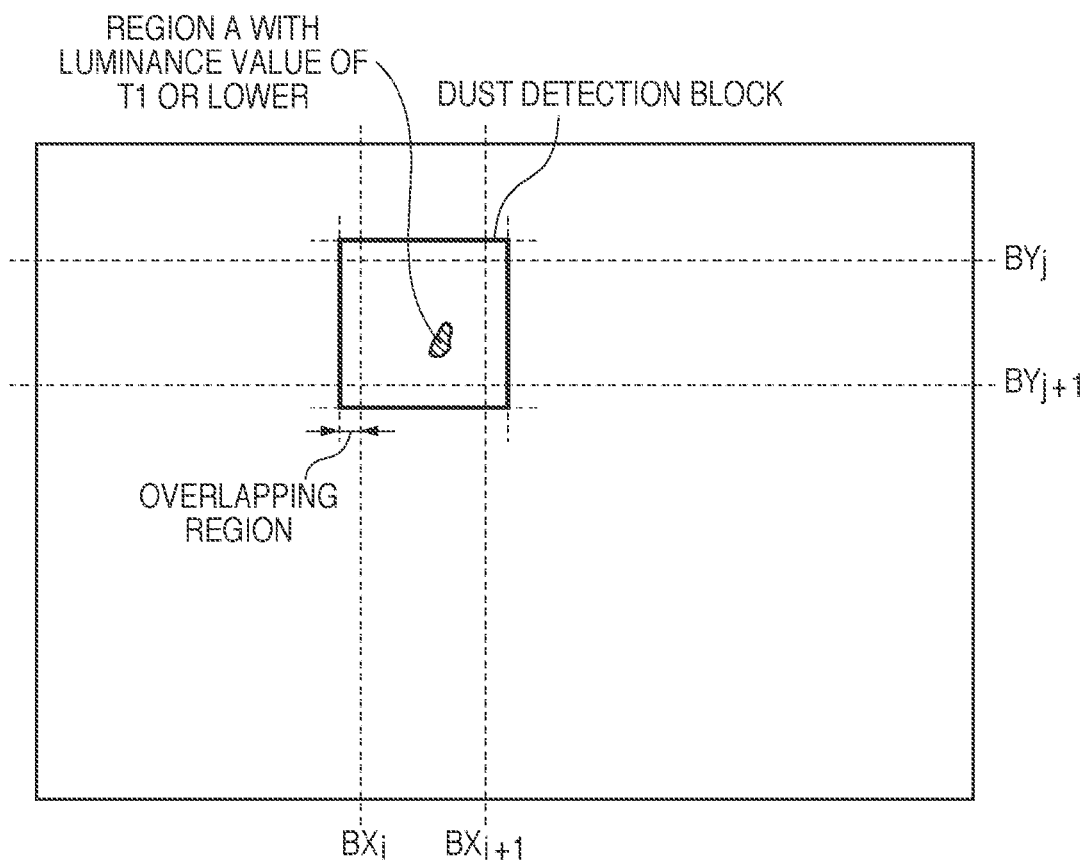
FIG. 6 is a conceptual diagram explaining a dust detection block according to the embodiment.

As illustrated in FIG. 6, retrieved image data is expanded in memory and processed while being scanned in blocks of a predetermined size. This is in order to cope with limb darkening due to lens or sensor properties. Limb darkening refers to a phenomenon that the luminance in the periphery of a lens is lower than in the central portion, and it is known that reducing the aperture of the lens will reduce the occurrence of such limb darkening to some degree. However, even with a small aperture, if dust positions in shot images are determined using predetermined threshold values, the problem still remains that dust at the periphery cannot be detected properly depending on the lens type. Thus, images are divided into multiple blocks in order to reduce the influence of limb darkening. If images are simply divided into blocks, in cases where different threshold values are used for the blocks, a problem arises that fluctuations may occur in detection results of dust that spans blocks. To deal with this, blocks are made to overlap each other, and pixels that are determined as dust in any blocks that constitute overlapping regions are handled as dust regions.

Figure 5:
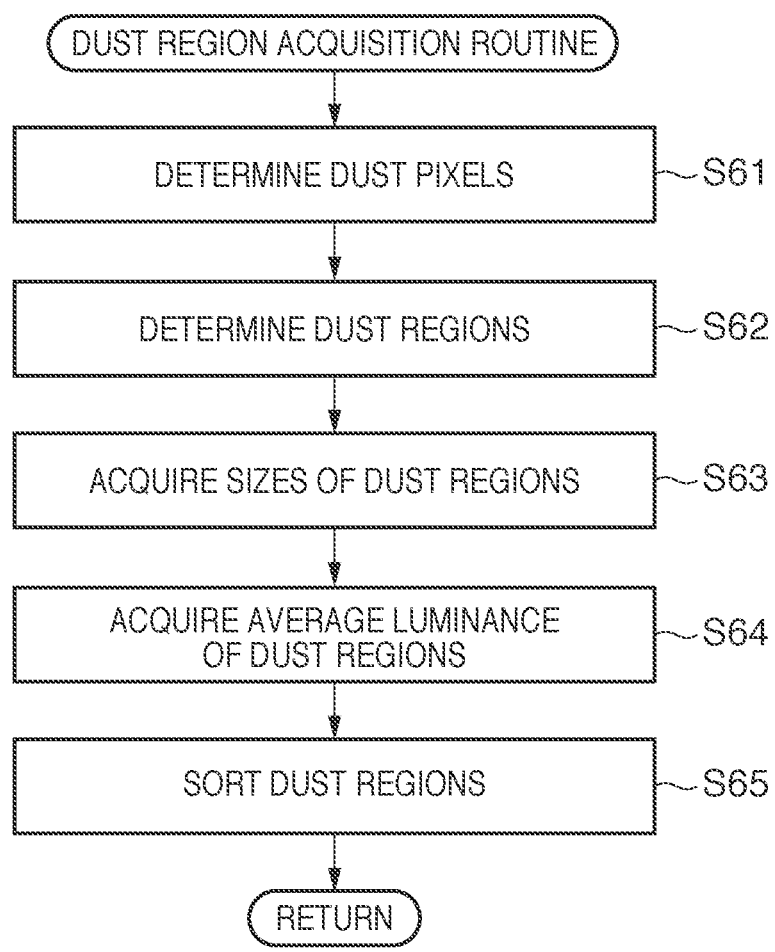
FIG. 5 is a flowchart showing a process of acquiring a dust region according to the embodiment.

The determination of dust regions in blocks is performed by the microcomputer CPU 402 according to the procedure shown in FIG. 5. First, a maximum luminance Lmax and an average luminance Lave are calculated in each block and, based on the calculated values, a threshold value T1 in, the block is calculated using the following equation. Assume in the present embodiment that a weight w assigned to the average luminance Lave is 0.6.

$$T1 = Lave \times w + Lmax \times (1-w), \text{ where } 0 \leq w \leq 1$$

Then, a process of determining dust pixels, in which pixels with luminance values smaller than the threshold value T1 are determined as dust pixels, is performed on each pixel in dust detection blocks (S61). After that, a process of determining dust regions is performed, in which isolated regions constituted by dust pixels are individually determined as dust regions di (i=0, 1, . . . , n) (S62). As illustrated in FIG. 7, for each dust region, maximum and minimum horizontal coordinates Xmax and Xmin of dust pixels constituting the dust region, and maximum and minimum vertical coordinates Ymax and Ymin thereof are obtained. Then, based on those values, a radius ri indicating the size of the dust region di is calculated from the following equation (S63).

$$ri = \sqrt{((Xmax - Xmin)/2)^2 + ((Ymax - Ymin)/2)^2} \tag{A}$$

Figure 7:
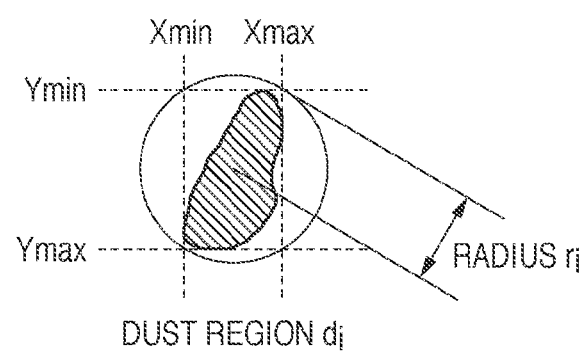
FIG. 7 is a conceptual diagram explaining a dust region according to the embodiment.

FIG. 7 shows the relationship between Xmax, Xmin, Ymax, Ymin, and ri.

Thereafter, in S64, an average luminance value for each dust region is calculated. The above calculated values are stored as the dust correction data. Note that, in some cases, a limitation may be put on the data size of the dust correction data due to a reason such as the size of the dust position memory 427. To cope with such cases, dust position information is sorted according to the sizes or average luminance values of dust regions (S65). In the present embodiment, a first sorting rule is such that data is sorted in order of ri from largest to smallest. In cases where dust regions have the same radius ri, a second sorting rule is used, in which data is sorted in order of increasing average luminance values. This allows more noticeable dust to be registered with higher priority in the dust correction data. Assume that Di represents an already-sorted dust region and Ri represents the radius of the dust region Di. It is, of course, to be understood that, in cases where some dust regions are larger than a predetermined size, those regions may be excluded from a list to be sorted and may be added to the end of the list of already-sorted dust regions. This is because subjecting dust regions that are larger than a certain size to later correction processing may contrarily degrade image quality, for which reason it is desirable that those dust regions are handled as last priorities to be edited. It is also noted that the dust detection method described in the present embodiment is merely one example, so the threshold values may be changed or other criteria may be adopted.

Shoot Processing Routine

Figure 8:
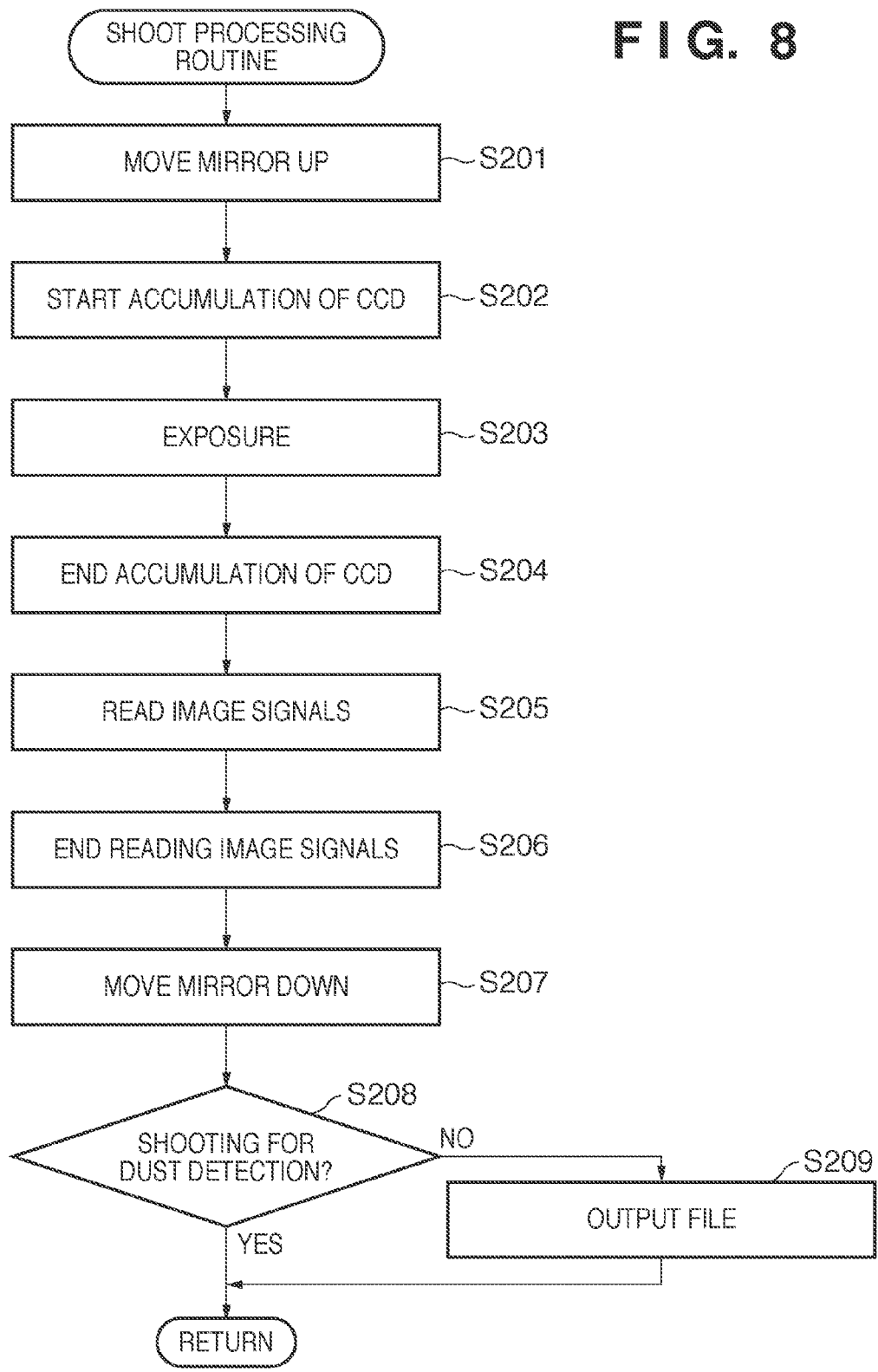
FIG. 8 is a flowchart of shoot processing according to the embodiment.

Next, the shoot processing routine performed in S24 in FIG. 3 will be described in detail with reference to the flowchart in FIG. 8. The processing is implemented by the microcomputer CPU 402 performing a shoot processing program stored in the dust position memory 427. Upon execution of the shoot processing routine, the microcomputer CPU 402 actuates the quick return mirror 203 illustrated in FIG. 2B in S201 so that the quick return mirror 203 makes a movement called "mirror-up" and retracts out of the shooting optical path.

Then, the accumulation of charge in the image sensor 418 is started in S202. Subsequently, in S203, the front curtain 210 and the rear curtain 209 of the shutter illustrated in FIG. 2B are run to allow exposure. Then, the accumulation of charge in the image sensor 418 is completed in S204. Subsequently, in S205, image signals are read from the image sensor 418 and processed by the A/D converter 423 and the image processing circuit 425, and resultant image data is primarily stored into the image buffer memory 424. When all image signals have been read from the image sensor 418 in S206, the processing proceeds to S207. In S207, the quick return mirror 203 is moved down to its inclined position, which completes a series of shooting operations. Thereafter, the processing proceeds to S208.

In S208, whether ordinary shooting or image shooting for dust detection (pre-shooting) is being performed is determined and, in the case of ordinary shooting, the processing proceeds to S209. Here, the determination of whether ordinary shooting or pre-shooting is being performed may be made based on user settings, for example. In S209, the dust correction data as illustrated in FIG. 4, together with camera settings and the like at the time of shooting, are recorded into the external storage device 419 in association with the image data. Specifically, for example in a case where image data recorded in the image sensing apparatus of the present embodiment is in accordance with the EXIF (exchangeable image file format), the data associations can be established by additionally writing the dust correction data into EXIF IFDs that are header regions of image files in which camera settings or the like at the time of shooting are recorded. Alternatively, the data associations may be established by recording the dust correction data as an independent file and recording only link information of the dust correction data into image data. However, if image data and dust correction data are recorded as separate files, their links may disappear at the time of moving the image data file, for which reason it is desirable that dust correction data is stored integrally with image data.

Processing by Image Processing Apparatus

Dust Reduction Processing

Figure 9:
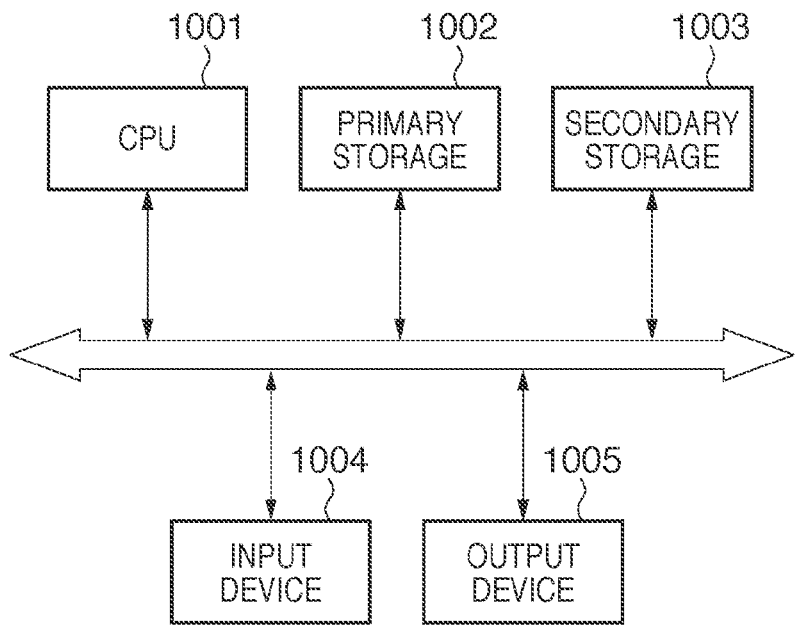
FIG. 9 is a block diagram illustrating an example configuration of an image processing apparatus according to the embodiment.

Next, a procedure of dust reduction processing will be described. Dust reduction processing is a process of selectively removing dust images from shot images based on dust correction data generated in a digital camera body. This processing is performed by an image processing apparatus that is provided separately from a digital camera. FIG. 9 illustrates rough outlines of a system configuration of such an image processing apparatus. A CPU 1001 controls operations in the whole system and executes programs stored in a primary storage unit 1002, for example. The primary storage unit 1002 is primarily a memory that reads and stores programs or the like stored in a secondary storage unit 1003. The secondary storage unit 1003 is a hard disk, for example. The primary storage unit 1002 is generally smaller in capacity than the secondary storage unit 1003, and programs or data that cannot be stored in the primary storage unit 1002 are stored in the secondary storage unit 1003. The secondary storage unit 1003 also stores data that needs to be held for a long period of time, for example. In the present embodiment, programs are stored in the secondary storage unit 1003, and the CPU 1001 executes such programs by reading them from the primary storage unit 1002 at the time of program execution. Examples of an input device 1004 include a mouse and a keyboard that are used to control the system, and also include a card reader, a scanner, and a film scanner that are necessary to input image data. Conceivable examples of an output device 1005 include a monitor and a printer. Various other embodiments are also conceivable as a method for constituting this apparatus, but this is not the principal of the present invention and thus will not be described herein.

The image processing apparatus is equipped with an operating system that is capable of implementing multiple programs in parallel, and operators can control programs that operate on this image processing apparatus, using GUIs. A representative example of the image processing apparatus is a PC (personal computer), for example. The image processing apparatus according to the present embodiment is capable of implementing two processes as its image editing functions. One process is copy and stamp processing, and another is repair processing. The copy and stamp processing as used herein refers to the function of copying one region of a specified image and compositing it into another region that has been specified separately. Repair processing as used herein refers to the function of detecting isolated regions that satisfy predetermined conditions in a specified region and correcting the isolated regions with surrounding pixels. The repair processing includes an automatic repair function of automatically performing repair processing on specified coordinates, using dust correction data attached to image data in the digital camera body. Details of the processing will be described in a later section titled "Repair Processing."

Figure 10:
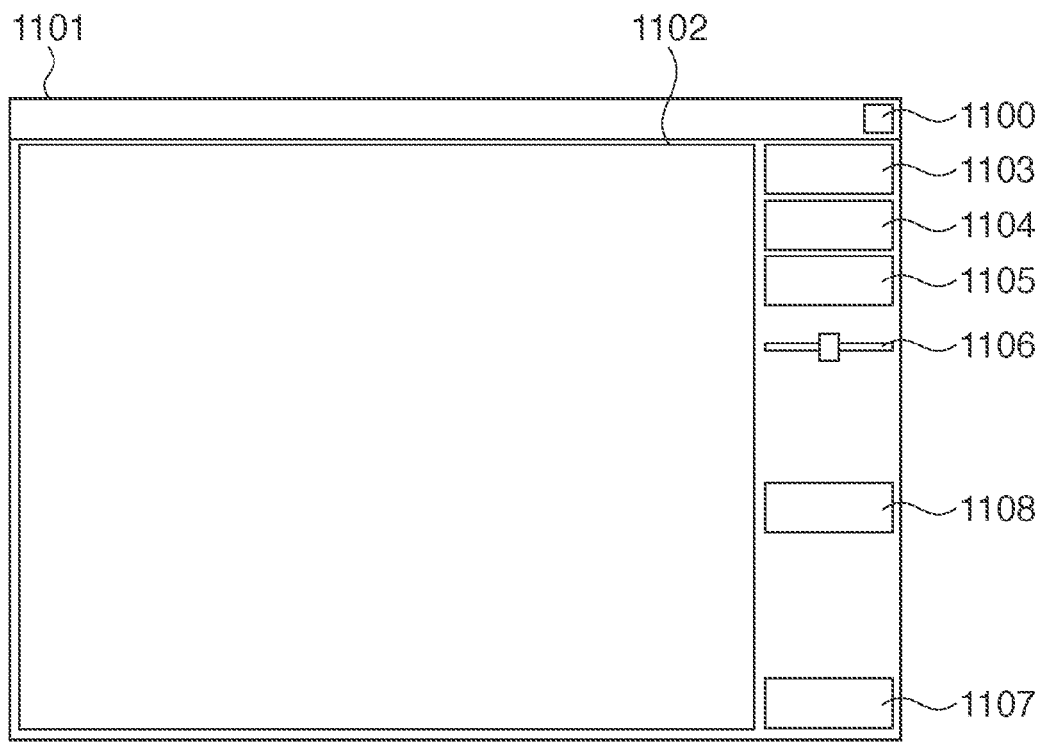
FIG. 10 illustrates an example GUI for an image editing application according to the embodiment.

FIG. 10 illustrates an example of a graphical user interface (GUI) of an image editing program performed by the image processing apparatus. A window has a CLOSE button 1100 and a title bar 1101, and programs are ended at the press of the CLOSE button. Images to be edited are specified by dragging and dropping files into an image display area 1102 and, when an image to be edited is determined, the filename of the image is displayed in the title bar 1101 and then the image to be edited is displayed so as to fit into the image display area 1102. There are two display modes for displaying images to be edited, namely "Fit" display and "Actual-size pixel display," which are switched with a display-mode button 1108. With the GUI of the present embodiment, processing positions are specified by clicking on images, and at the time of "Fit" display, coordinates that correspond to clicked positions in images to be processed are calculated according to zoom rates, and processing is performed on those coordinates. Also with the GUI of the present embodiment, while the range of processing is specified by a radius, this radius is a radius in an image to be edited and thus can differ from that of a "Fit"-displayed image depending on the zoom rate.

At the press of an automatic repair processing execute button 1103, automatic dust reduction processing described later is performed, and a processed image is displayed in the image display area 1102. The automatic repair processing execute button 1103 is enabled only when an image has not yet been edited, and it is disabled when an image has already been edited by the execution of copy and stamp processing, repair processing, or automatic repair processing. A radius slider 1106 specifies the range of application of copy and stamp processing or repair processing. At the press of a repair processing mode button 1104, the apparatus enters a repair processing mode. With a left click on an image during the repair processing mode, the repair processing described later is applied to a region whose center is defined by left-clicked coordinates and whose radius is defined by the number of pixels specified by the radius slider 1106. After the application of the repair processing, the apparatus exits the repair processing mode. Meanwhile, with a right click on the image display area 1102 during the repair processing mode or with the press of any button on the GUI, the apparatus exits the repair processing mode.

With the press of a copy stamp processing mode button 1105, the apparatus enters the copy stamp mode. With a left click on an image during the copy stamp mode, the left clicked coordinates are set to center coordinates of a copy-source region. With a further left click on the image with the center coordinates of the copy-source region having been set, the apparatus performs copy and stamp processing using the left clicked coordinates as the center coordinates of a copy-destination region and using the radius specified at this time by the radius slider 1106 as a radius of the range of copying, and exits the copy stamp mode after reverting the center coordinates of the copy-source region to a no-setting state. Meanwhile, with a right click on the image display area 1102 during the copy stamp mode or at the press of any button on the GUI, the apparatus exits the copy stamp mode after reverting the center coordinates of the copy-source region to a no-setting state. At the press of a save button 1107, the processed image is stored.

Figure 13:
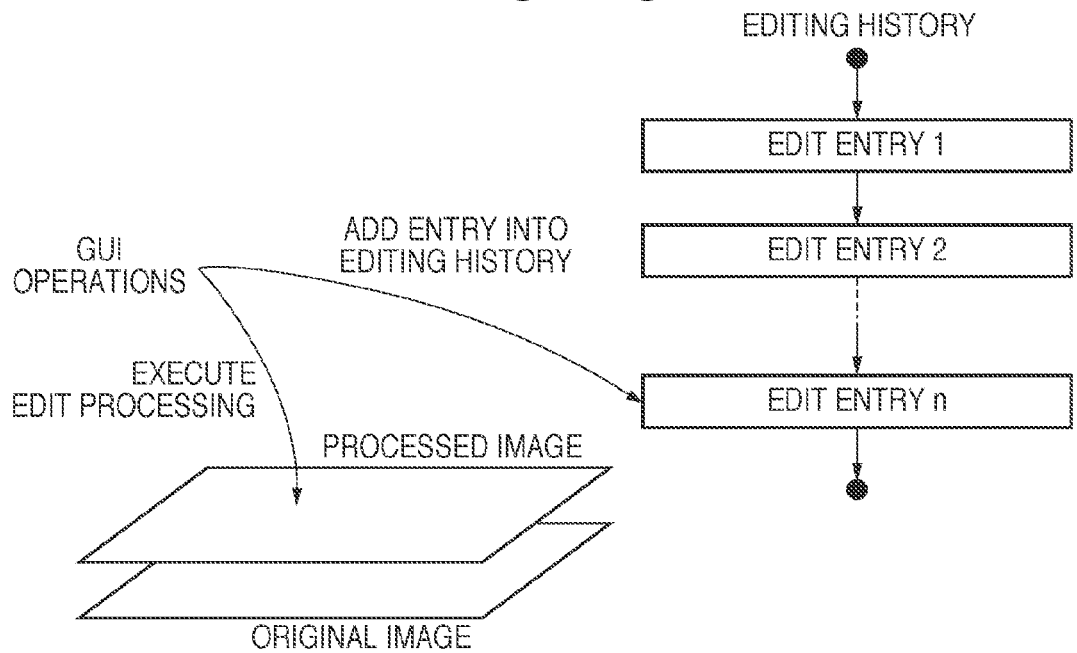
FIG. 13 is a conceptual diagram explaining an editing history at the time of image editing according to the embodiment.

In the image editing program of the present embodiment, both original images and processed images are stored as illustrated in FIG. 13. Edit processing specified by the GUI is applied to processed images, and such applied edit processing is registered in an editing history. A single instance of edit processing registered in the editing history is referred to as an edit entry. FIG. 14 illustrates an example of edit entries. In the present embodiment, each edit entry includes a processing ID that identifies whether copy and stamp processing or repair processing was performed, the center and radius that define a region to which processing was applied, relative coordinates from copy-source coordinates to copy-destination coordinates, which were necessary for copy and stamp processing, and differential image data described later. When automatic repair processing is performed, repair processing is performed according to dust correction data, and an edit entry is added into the editing history every time repair processing is applied. Containing such a history allows the apparatus to completely destroy the editing history and restore original images or to cancel immediately preceding edit processing. For example, a process of cancelling immediately preceding edit processing can be implemented by once overwriting processed images with original images and re-performing edit processing until immediately before the edit entry to be cancelled. However, re-performing edit processing may take considerable time in some cases, such as where there is a large number of entries. In such cases, every time when edit operations are performed, a difference in image data between before and after execution of edit processing is obtained and stored into the edit entry. By storing such differential images, only differential images need to be reflected instead of re-performing edit processing described in edit entries.

Repair Processing

Next, repair processing and automatic repair processing will be described in detail. Copy and stamp processing is a well-known technique, so its detailed description is omitted herein. Repair processing is a process of detecting isolated regions in a specified region and correcting the isolated regions. Repair processing is implemented by applying a correction routine, which will be described later, to a region represented by center coordinates and a radius specified on the GUI.

Figure 11:
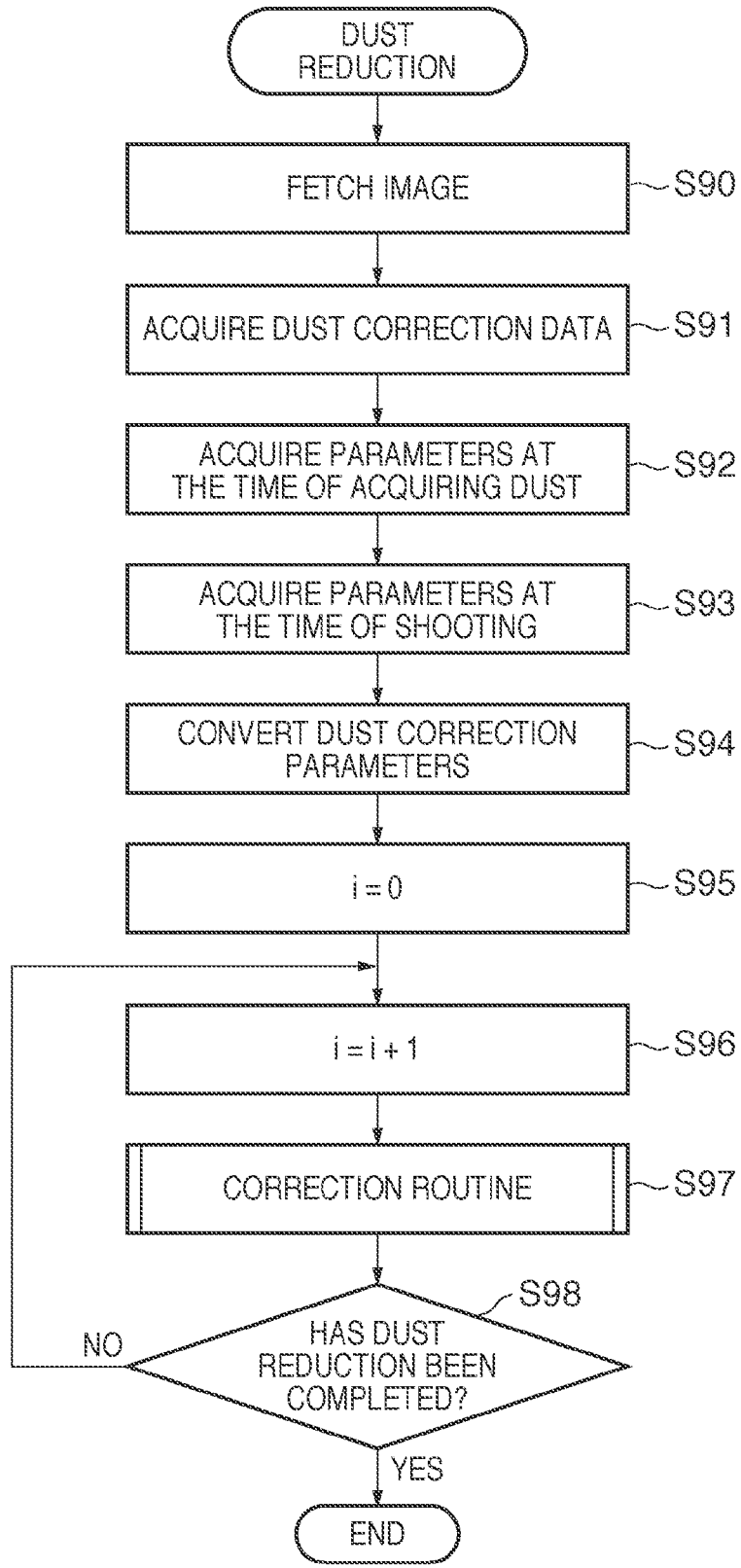
FIG. 11 is a flowchart showing a process of reducing dust according to the embodiment.

Automatic repair processing is a process of extracting dust correction data from ordinary shot image data and automatically performing repair processing according to the dust correction data. FIG. 11 shows a basic procedure of automatic repair processing. First, the image processing apparatus fetches ordinary shot image data with dust correction data attached thereto from the external storage device 419 that is mounted in or detached from the digital camera, and then stores the fetched data into the primary storage unit 1002 or the secondary storage unit 1003 (S90). Then, the dust correction data that has been attached to the shot image in S209 is extracted from the ordinary shot image data (image to be subjected to dust reduction processing) (S91). Then, a sequence of coordinates $Di$ ($i=1, 2, \ldots,$ and n), a sequence of radii $Ri$ ($i=1, 2, \ldots,$ and n), an aperture value $f1$, and a pupil position $L1$ are acquired from the dust correction data extracted in S91 (S92). Here, $Ri$ represents the dust size at the coordinates $Di$ calculated in S65 in FIG. 5. In S93, an aperture value $f2$ and a pupil position $L2$ at the time of ordinary shooting are acquired. Subsequently, $Di$ is converted, using the following equation, in S94. Assume, as illustrated in FIG. 16, that d is the distance from the center of an image (optical axis position) to the coordinates $Di$, and H is the distance between the surface of the image sensor 418 and an LPF on the imaging surface (in the present example, it is equivalent to the distance between the image sensor 418 and the dust). Converted coordinates $Di'$ and a converted radius $Ri'$ are defined by the following equations, for example.

$$Di'(x,y)=((L1-H)\times L2)/(L2\times(L2-H))\times d\times Di(x,y) \quad (B)$$

$$Ri'=(Ri\times(f1/f2)+M)\times 2 \quad (C)$$

The units as used herein are in pixel. The symbol M represents the amount of the margin of $Ri'$. In the present example, $M=3$. The radius is doubled because of the reason that, since dust regions are detected using an average luminance, regions outside the dust regions are necessary.

In S95, a correction processing counter i is initialized to 0. In S96, the correction processing counter i is incremented. In S97, the correction routine is performed on a region that is represented by the i-th coordinates $Di'$ and the i-th radius $Ri'$, so as to remove dust from the region. Hereinafter, a region on which the correction routine is performed is referred to as a "repair-processing target region". In S98, it is determined whether or not dust reduction processing has been applied to all coordinates and, if all coordinates have already been processed, the processing is ended and, if not, the processing returns to S96. Here, it is known that dust images were blurred and less noticeable with a smaller f value at the time of shooting (as the aperture is getting close to a full aperture). Thus, it is conceivable that the f value at the time of shooting is referred to prior to the execution of automatic repair processing and, if the f value is smaller than a predetermined threshold value, no repair processing at all is performed. This allows analysis processing or other processing to be omitted, thereby allowing efficient execution of processing even in cases where there are many images to be edited. For example, in the present embodiment, processing is skipped in cases where the f value is smaller than f8, at which dust becomes less noticeable.

Figure 15:
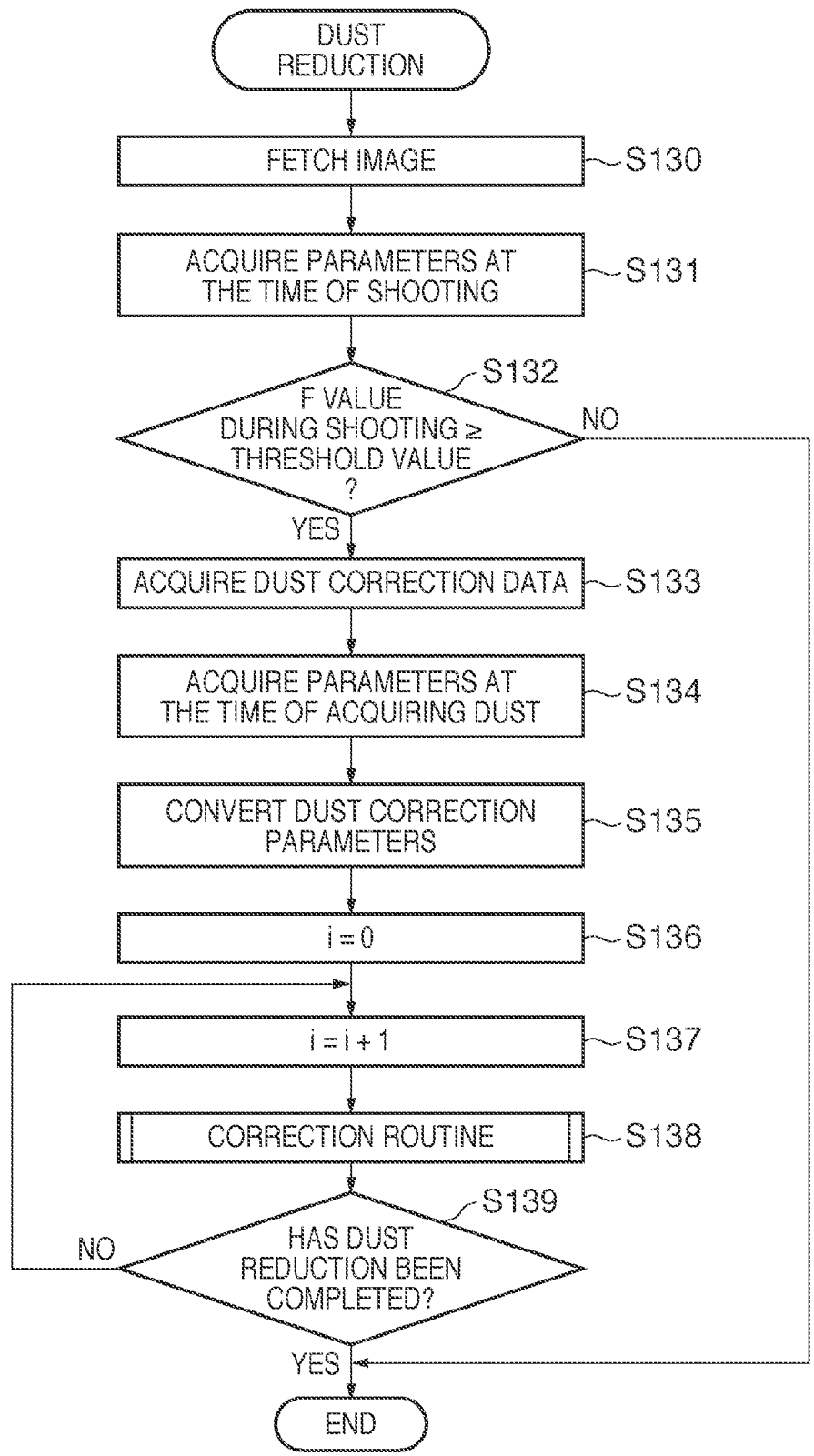
FIG. 15 is a flowchart showing a process of reducing dust according to the embodiment.

Such a modified procedure of automatic repair processing is illustrated in FIG. 15. This is similar to that in FIG. 11, except for the process of acquiring parameters at the time of shooting prior to all processes (S131) and the process of comparing the parameters with threshold values (S132). In S132, if the f value at the time of shooting is greater than or equal to a predetermined value, dust reduction processing is continued, and if it is less than the threshold value, the processing is ended.

Correction Routine

Figure 12:
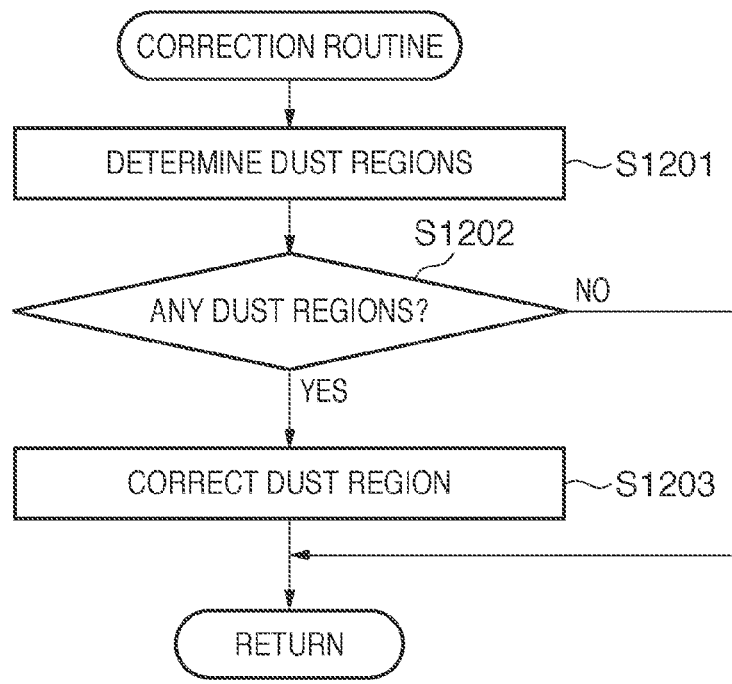
FIG. 12 is a flowchart of correction processing according to the embodiment.
Figure 17:
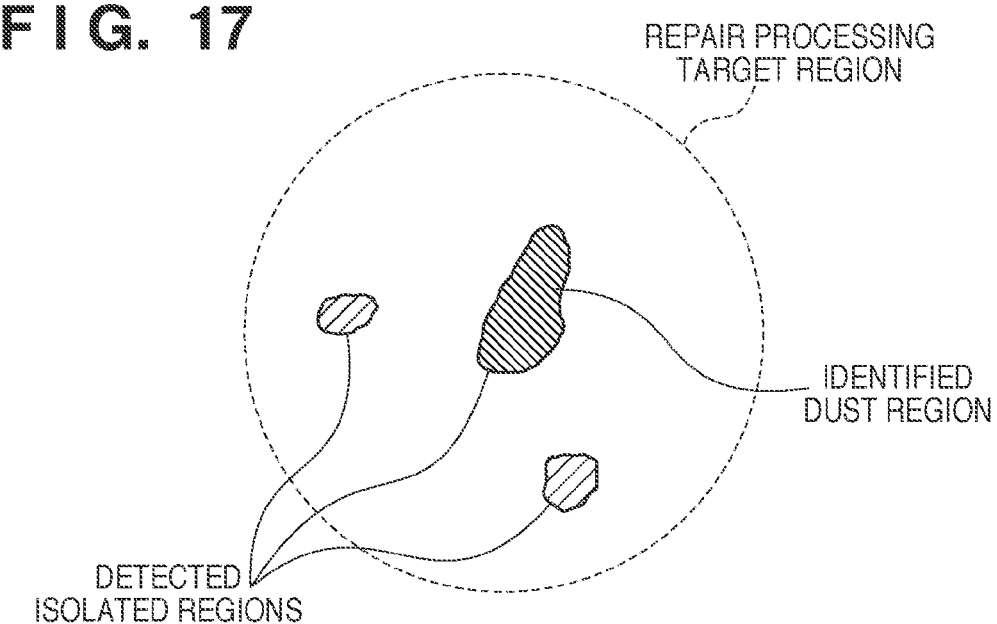
FIG. 17 is a conceptual diagram explaining detection of a dust region according to the embodiment.

Now, the correction routine performed in repair processing and automatic repair processing will be described. FIG. 12 is a flowchart showing a procedure of the correction routine. First, a dust region is determined in S1201. Assume that P indicates center coordinates of a repair-processing target region, and R indicates the radius of the region. Dust regions as used herein refer to regions that satisfy all the following conditions. FIG. 17 illustrates an example of such dust regions. Assume in the present embodiment that a weight w assigned to an average luminance Yave is 0.6.

(1) a region that is darker (has a lower luminance value) than a threshold value T2

$$T2 = Yave \times w + Ymax \times (1-w), \text{ where } 0 \leq w \leq 1$$

(2) a region that is not in contact with the circle represented by the center coordinates P and the radius R (3) from among isolated regions configured by low-luminance pixels selected based on the condition (1), a region that has a radius that satisfies the following condition (where l1 and l2 are predetermined threshold values for the number of pixels)

$$l1 \leq Ri \leq l2$$

(4) a region that includes the center coordinates P of the circle that is a repair-processing target region Note that the condition (4) is to be added at the time of automatic repair processing.

In the present embodiment, l1 is 3 (pixels), and l2 is 30 (pixels). This allows only small isolated regions to be determined as dust regions. A dust region specification unit is implemented by this processing. In S1202, if there is a dust region, the processing proceeds to S1203, in which dust region correction is performed. If there is no dust region, the processing is ended. The dust region correction processing performed in S1203 is implemented by a known defective-region correction method, which is not particularly limited herein. An example of such known defective-region correction methods is pattern replacement disclosed in Japanese Patent Laid-Open No. 2001-223894. In Japanese Patent Laid-Open No. 2001-223894, while defective regions are identified using infrared light, dust regions detected in S1201 may be used as defective regions in the present embodiment. Such pattern replacement corrects dust regions with surrounding normal pixels. As to pixels that are not filled in by pattern replacement, another method may be used, such as for image data after pattern correction, selecting p normal pixels in order of increasing distance from the pixel to be corrected and q normal pixels in order of decreasing distance from the pixel to be corrected and correcting pattern-corrected image data using average colors of the selected pixels.

As described above, attaching dust correction data to images brings about the advantage of eliminating the need for users to be aware of associations between dust correction image data and shot image data. In addition, since the dust correction data is compact because it is structured by position, size, and conversion data (aperture value and pupil position), there is no fear that the shot image data size will increase significantly. Moreover, performing correction processing on only regions that include pixels specified based on the dust correction data allows a considerable reduction in the probability of misdetection. Still further, controlling whether to perform or not perform automatic repair processing according to the f value at the time of shooting allows more appropriate processing to be performed. The above description is the outline of the dust reduction processing.

Countermeasures Against Optical-Axis Shift

Figure 18:
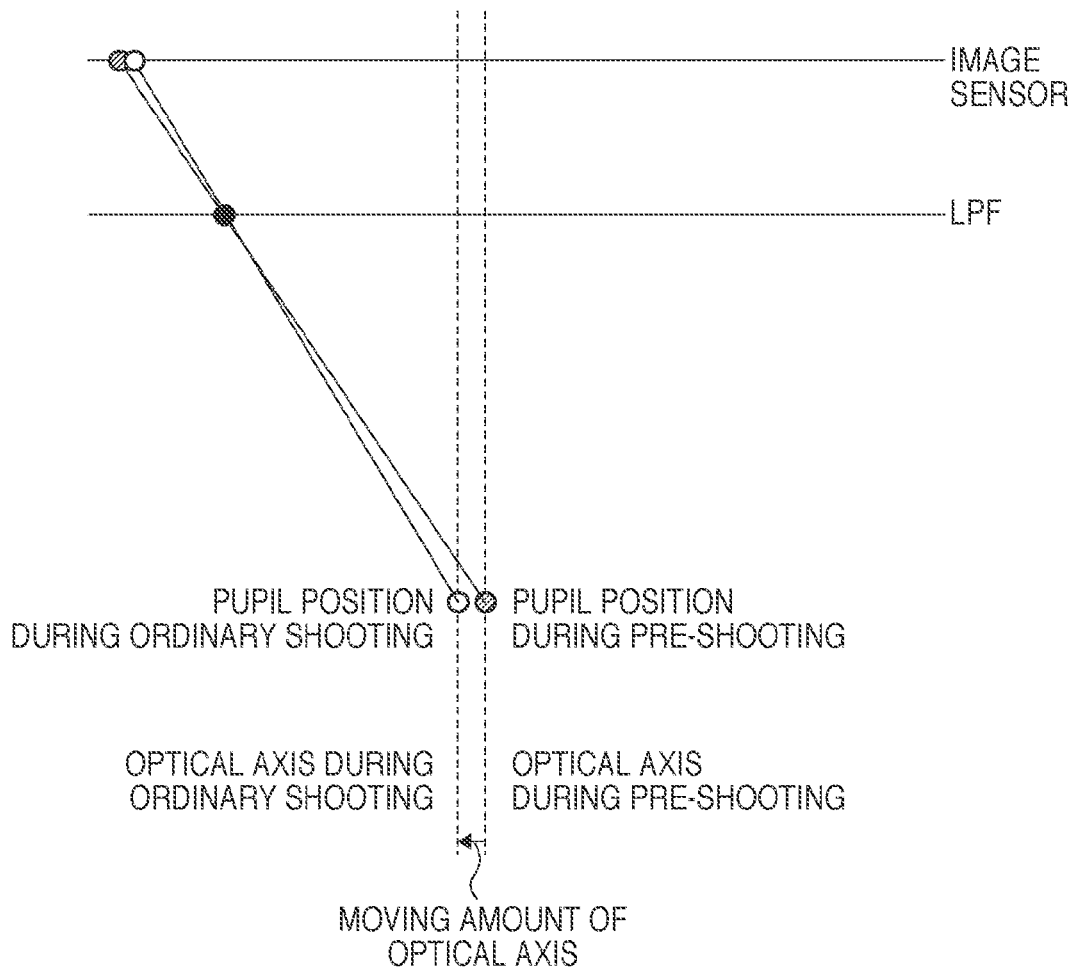
FIG. 18 is a diagram explaining changes in shooting position that accompany changes in optical-axis position according to the embodiment.
Figure 19:
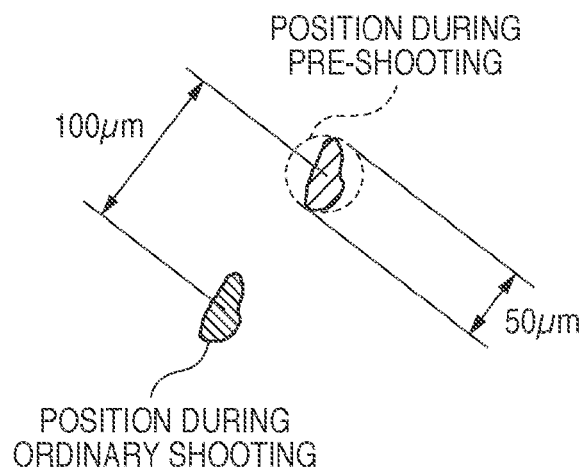
FIG. 19 is a diagram explaining changes in the position of a dust region that accompany changes in shooting position according to the embodiment.

The above description does not take into account movements of the optical axis at the time of shooting using shifting lenses or due to optical camera shake correction. In cases where the optical axis moves, even though the pupil position is unchanged between at the time of pre-shooting and at the time of ordinary shooting, dust image positions are shifted as illustrated in FIG. 18. For example, in a case where the distance between the LPF and the image sensor is 5 mm and the pupil position is 55 mm, a dust image with an image height of 18 mm is described by way of example. This dust will form an image at a position having an image height of 19.8 mm in cases where the optical axis does not move between at the time of pre-shooting and at the time of ordinary shooting. On the other hand, in a case where the optical axis is shifted 1 mm at the time of ordinary shooting as illustrated in FIG. 18, the dust forms an image at a position having an image height of 19.7 mm that is obtained by adding 1 mm, that is, the moving amount of the optical axis from the original position, to 18.7 mm, that is, the distance of the dust from the moved optical axis. In other words, the dust image is shifted 0.1 mm by the optical-axis shift. In a case where the sensor pitch is 5 μm, a dust image having a dust diameter of 50 um corresponds to 10 pixels in an image, but the moving amount of 0.1 mm of the dust image corresponds to a shift of 20 pixels, which indicates that the optical axis has a considerable influence on images (FIG. 19). Under this condition, if the processing described with reference to FIG. 17 is applied, dust that is originally should be removed is excluded from the list to be removed. Also, in another case where isolated regions that are not dust happen to exist at shifted positions, there is the possibility of such regions being processed as dust to be removed.

Thus, the present embodiment describes the case where, in automatic repair processing, coordinate conversion is performed in consideration of not only the dust correction data but also the moving amount of the optical axis. Assume that, at the time of ordinary shooting, camera shake correction processing is enabled and thus movements of the optical axis occur. In order to perform processing with consideration given to the moving amount of the optical axis, it is necessary to acquire the moving amount of the optical axis, which may be detected by a sensor or the like at the time of ordinary shooting, and add the moving amount to image data as shooting information. Here, the moving amount of the optical axis acquired by an optical axis moving amount acquisition unit is recorded into an area for recording maker-specific information. The area for recording maker-specific information is equivalent to, for example in cases where the format of image data to be recorded is in accordance with the EXIF standard, MakerNote tags in EXIF IFDs. The moving amount of the optical axis according to the present embodiment refers to horizontal and vertical moving amounts (pixels) in shot images.

Meanwhile, at the time of pre-shooting, camera shake correction processing is disabled and the optical axis is fixed to the center of an imaging region. In cases of using lenses such as shifting lenses that mechanically specify the optical axis, if the optical axis is shifted, a warning is displayed, for example, and pre-shooting is terminated. Thus, the moving amount of the optical axis is not recorded in dust correction data. The optical axis is fixed to the center of an imaging region at the time of pre-shooting for the following reasons. One reason is because pre-shooting for detecting only dust positions does not necessitate camera shake correction and has a better chance of properly detecting dust since dust images are not blurred even though subjects are blurred. Another reason is in order to prevent optical-axis shifts from causing dust images to blur, thereby reducing detection accuracy or causing difficulty in acquiring proper dust positions.

Figure 21:
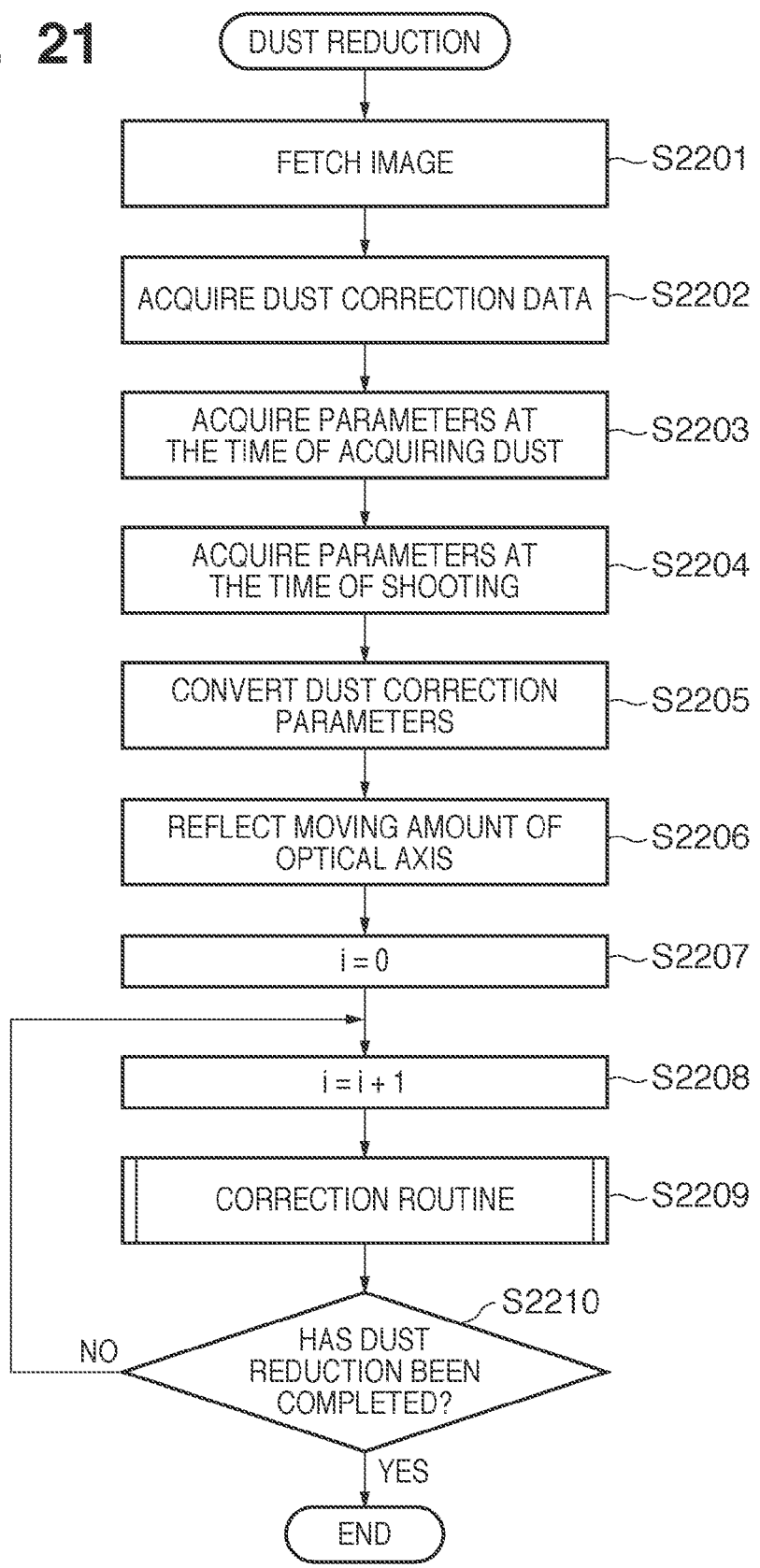
FIG. 21 is a flowchart showing a process of reducing dust according to a first embodiment.

With consideration given to optical-axis shifts, the procedure of automatic repair processing according to the present embodiment is as shown in FIG. 21, instead of in FIG. 11. The procedure shown in FIG. 21 is identical to that in FIG. 11, except for the addition of S2206. In the present embodiment, in order to take into account a moving amount Z of the optical axis, a position Di' is calculated after the conversion of the dust correction parameters in S2205, which corresponds to S94 in FIG. 11 according to the first embodiment. Thereafter, in S2206, a process of conversion into the position in consideration of the moving amount Z of the optical axis is applied, in which point the procedure differs from that in FIG. 11. Note that the moving amount Z of the optical axis is constant regardless of coordinates in shot images and that it is represented by vectors having horizontal and vertical components. Note that, in cases where all components of the moving amount Z of the optical axis are 0, it indicates that the optical axis is at the center of the shot image. That is, it indicates that the optical axis did not move. Now, methods for calculating coordinates Di" (x, y) and a radius Ri" that define a repair-processing target region, the methods being used in the processing performed in S206, will be described in sequence.

Figure 20:
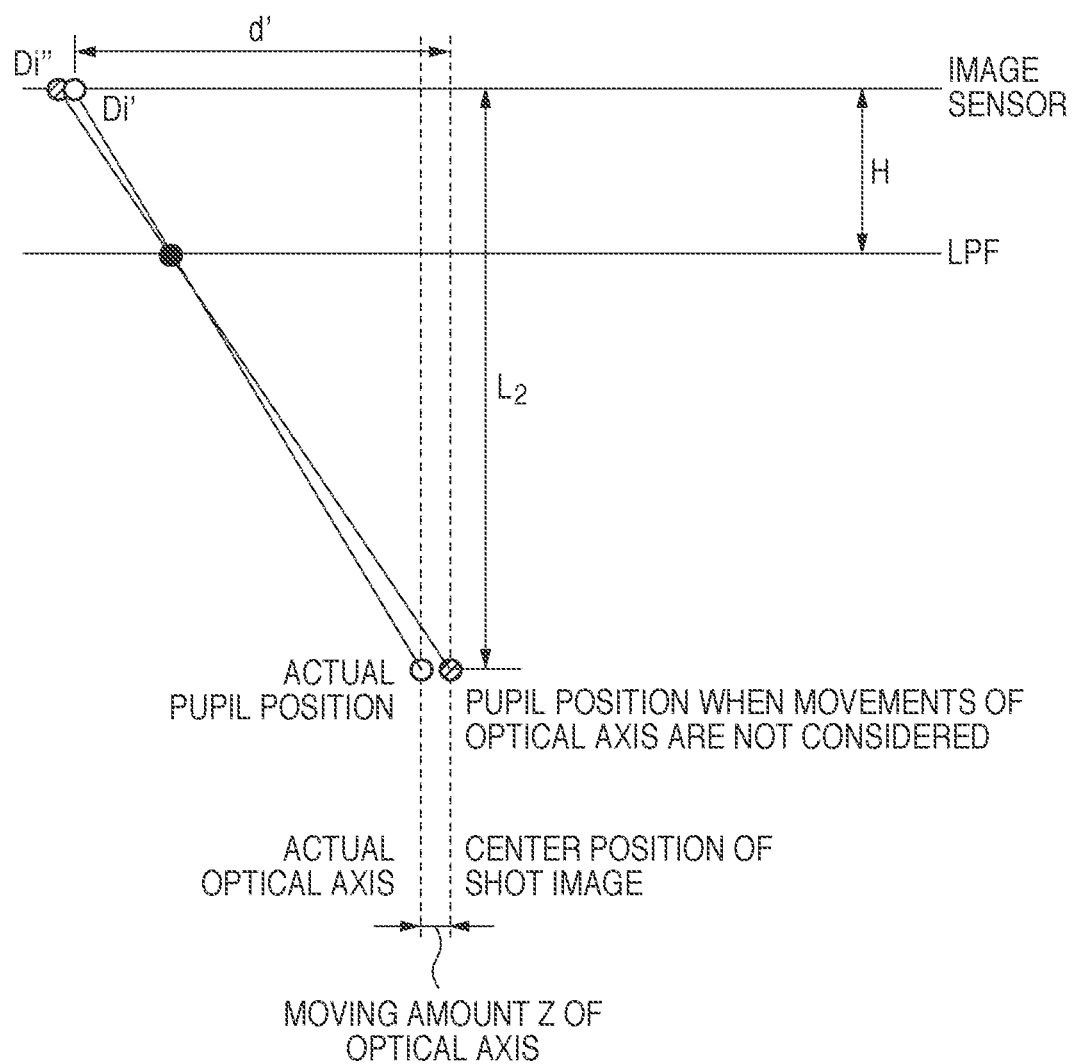
FIG. 20 is a diagram explaining changes in shooting position that accompany changes in optical-axis position according to the embodiment.

First, the method for calculating the coordinates Di" (x, y) will be described. As a first step, the position Di' of a dust image at the time of ordinary shooting in the case where movement of the optical axis is not considered is calculated, using the equation (B). Then, as illustrated in FIG. 20, the coordinates Di" are calculated by converting the position Di' in consideration of movement of the optical axis, using the following equation.

The coordinates Di" (x, y) calculated in S2206 and to which automatic repair processing is applied are expressed by the following equation, using the position Di' (x, y) and the moving amount Z of the optical axis.

$$Di''(x,y) = Di'(x,y) - (H/(L2-H)) \times Z \quad (D)$$

Similarly, the radius is also converted according to the moving amount Z of the optical axis. For exact conversion, it is desirable, for example, that several points on the circumference that have previously been determined from the coordinates Di and the radius Ri prior to coordinate conversion may be converted in order to determine a region that contains all such converted points as Ri". This, however, increases the amount of calculations, so in the present embodiment, the amount of the margin M, "+3", that is used in the calculation of Ri' expressed by the equation (B) is changed according to the moving amount Z of the optical axis. For example, the radius Ri" after conversion is obtained from the following equation.

$$Ri'' = (Ri \times (f1/f2) + (|Z|/2)) \times 2 \quad (E)$$

Assume that |Z| is the norm of the moving amount Z of the optical axis.

As described above, the moving amount of the optical axis is acquired in S2206, and in S2209, dust reduction processing is performed in consideration of the moving amount of the optical axis, using the same method as in S97. This allows the dust reduction processing to be performed in response to movements of dust images due to the use of optical systems that accompany movements of the optical axis that are caused due to optical camera shake correction processing or by shifting lenses, for example.

Second Embodiment

Figure 22A:
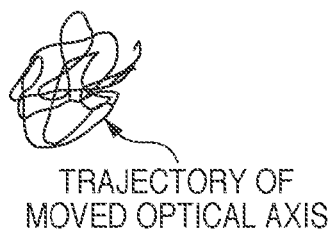
FIGS. 22A to 22C are diagrams explaining movements of an optical axis according to the embodiment.

For example, in cases of performing optical camera shake correction, it is known that the moving amount of the optical axis is determined not uniquely, but rather moves around finely as illustrated in FIG. 22A, for example. In the first embodiment, however, the range of camera shake correction during exposure is not considered. Thus, the present embodiment describes automatic repair processing in cases where the moving amount of the optical axis is not a certain single value, but rather includes variations in the optical axis during exposure.

Figure 22B:
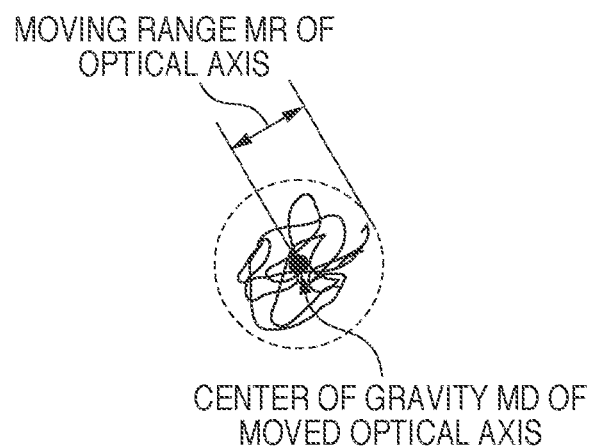

In the present embodiment, the moving amount of the optical axis is represented not simply by vectors, but rather by the center of gravity MD of the optical axis that varies during exposure and a radius MR that indicates the range of variation (hereinafter referred to as a variation MR in the optical axis) as illustrated in FIG. 22B. Note that, at the time of pre-shooting according to the present embodiment, camera shake correction functions are disabled as in the first embodiment. The procedure of automatic repair processing according to the present embodiment is similar to that of the first embodiment in FIG. 21. It, however, differs in the contents of processing performed in S2206 from that in the first embodiment. The procedure also has different criteria for determining dust regions in the correction routine performed in S2209. Now, the details of the procedure will be described.

Figure 22C:
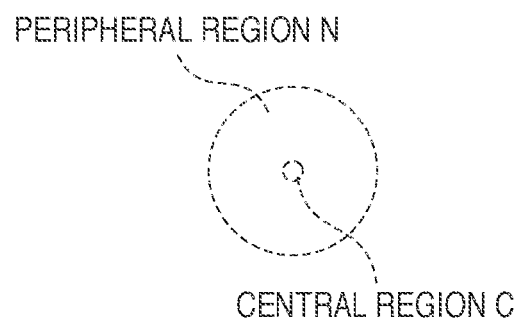

First, a process of reflecting the moving amount of the optical axis is described. Unlike in the first embodiment, the moving amount of the optical axis includes variations, so the repair-processing target region is represented not by a center point and a radius, but rather by a central region C and a peripheral region N as illustrated in FIG. 22C. Specifically, the center coordinates of dust (dust region) move within the central region C, and the peripheral region N therearound represents the range of possible movements of pixels in the dust region (the range that may affect image data). FIG. 23 shows a flowchart showing the process of reflecting the moving amount of the optical axis, performed in S2206. A process of converting the coordinates Di' and the radius Ri' acquired in S2205 into the central region and the peripheral region is performed in the following procedure. First, in S2601, a temporary central region C is set based on the coordinates Di' and the variation MR in the optical axis. Assume, for example, that a circle defined by the center Di', a radius α×MR, and a weight α of 0.1 is determined as the temporary central region C. Then, a temporary peripheral region N defined by the center Di' and a radius Ri' is set in S2602. In S2603, several points are set on the circumferences of the temporary central region and the temporary peripheral region that have been set in S2601 and S2602, respectively. For example, in the present embodiment, eight points located at positions that divide the circumferences into eight equal parts with reference to a horizontal position are set as illustrated in FIG. 24.

In S2604, from among the points set in S2603, the points on the circumference of the temporary central region are converted using the equation (D). The moving amount of the optical axis used in the equation (D) is, for example as illustrated in FIG. 25, a value that is obtained by assigning a weight with a value of β to the variation MR in the optical axis in both horizontal and vertical directions with respect to the center of gravity MD of the optical axis. Specifically, z=β×MR and, in the present embodiment, β=0.5. Similarly, all the points on the circumference of the temporary peripheral region are converted in S2605. In S2606, a region that contains all coordinates obtained by converting the temporary central region is defined as a central region, and a region that contains all coordinates obtained by converting the temporary peripheral region is defined as a peripheral region.

Next, the criteria for determining dust regions according to the present embodiment will be described. In the present embodiment, since a repair-processing target region does not have the center coordinates, a region that includes not the center coordinates of a repair-processing target region, but rather includes pixels included in the central region is subjected to correction processing. Specifically, the criteria are as follows. Assume in the present embodiment that a weight w assigned to the average luminance Lave is 0.6.

(1) a region that is darker (has a lower luminance value) than the threshold value T2

$$T2 = Yave \times w + Ymax \times (1-w), \text{ where } 0 \leq w \leq 1$$

(2)' a region that is not in contact with the circles that are the temporary central region C and the temporary peripheral region N that is represented by the radius Ri'
(3) from among isolated regions constituted by low-luminance pixels selected based on the condition (1), a region that has a radius value that satisfies the following condition (assuming that l1 and l2 are predetermined threshold values for the number of pixels)

$$l1 \leq Ri \leq l2$$

(4)' a region that includes the temporary central region C of a circle of a repair-processing target region As described above, the moving amount of the optical axis includes variations in the optical axis during exposure, and a region to be corrected is identified based on the variations. This allows flexible approaches to variations in the optical axis and accordingly produces proper correction results.

Third Embodiment

In cases where the moving amount of the optical axis is dispersed widely or where the range of movement has a large radius, dust images are expected to appear blurred, in which case a method that does not perform dust reduction processing may be used. In the present embodiment, as in the second embodiment, information about movements of the optical axis includes not only the center of gravity of the moved optical axis and the radius of the range of movement of the optical axis, but also dispersion in the moving amount of the optical axis. Based on this information, automatic repair processing is not performed in cases where the range of movement has a large radius or where the moving amount is dispersed widely.

Figure 26:
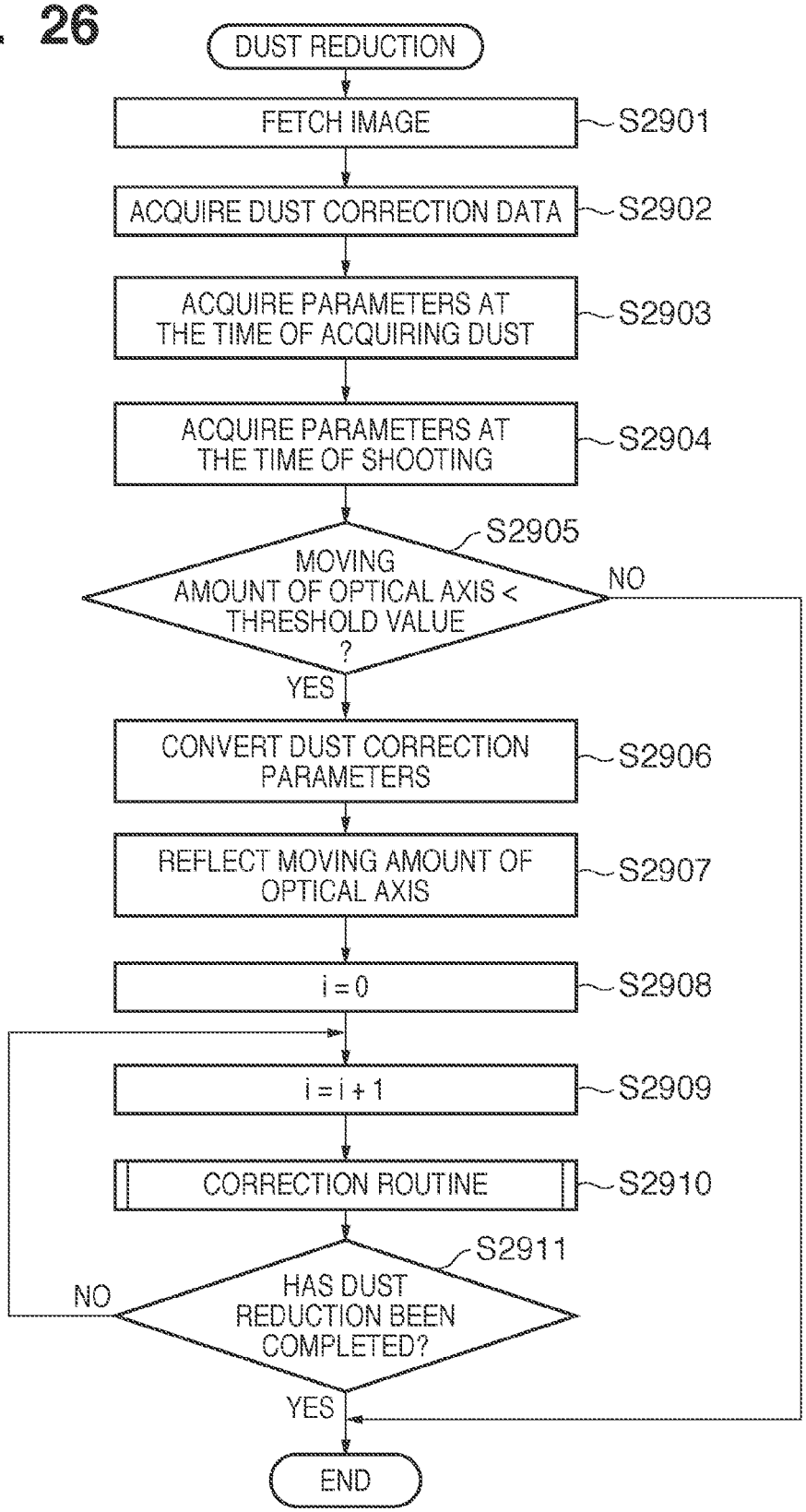
FIG. 26 is a flowchart showing a process of reducing dust according to a third embodiment.

FIG. 26 is a flowchart showing a procedure of automatic repair processing according to the present embodiment. The overall procedure is similar to that described in the second embodiment with reference to FIG. 21, but it differs from the other embodiments in that, after the acquisition of parameters at the time of shooting in S2904, automatic repair processing may be skipped depending on the information about movements of the optical axis in S2905. In S2905, it is determined whether or not the variations in the optical axis during exposure are small. If the variations are small, the dust reduction processing is continued. A conceivable example of the determination method is a method for calculating dispersion $\sigma^2$ of the variations in the optical axis during exposure and performing predefined thresholding on the calculated value. Another conceivable determination method is performing thresholding on the variation MR in the optical axis. In the present embodiment, by way of example, a threshold value TMR for the variation MR in the optical axis is determined as 10 (pixels) and, if the optical axis moves more than the threshold value, the processing is terminated without performing automatic repair processing. Specifically, if MR>TMR in S2905, the processing is terminated, and if MR≤TMR, the processing proceeds to S2906 in order to continue subsequent processing.

The above-described processing allows proper correction results to be acquired based on movements of the optical axis. It is also feasible to reduce the load of image processing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-159123, filed Jul. 3, 2009, which is hereby incorporated by reference herein in its entirety.

What is claimed is:

1. An image sensing apparatus having a camera shake correction function of moving an optical axis of an image sensing device, the apparatus comprising:
    an optical axis moving amount acquisition unit configured to acquire a moving amount of the optical axis at the time of shooting;
    a dust pixel determination unit configured to scan image data acquired by pre-shooting, during which the camera shake correction function is disabled, and determine a dust pixel corresponding to dust that is adhered to the image sensing device;
    a dust correction data generation unit configured to generate dust correction data based on information about the dust pixel that has been determined by the dust pixel determination unit; and
    a holding unit configured to hold the moving amount of the optical axis acquired by the optical axis moving amount acquisition unit and the dust correction data generated by the dust correction data generation unit,
    wherein the optical axis moving amount acquisition unit acquires a moving amount that is a difference in position between the optical axis at the time of pre-shooting and the optical axis at the time of ordinary shooting, during which the camera shake correction function is enabled, and
    wherein the holding unit holds the moving amount of the optical axis and image data at the time of ordinary shooting in association with each other.

2. The image sensing apparatus according to claim 1, wherein the image sensing device includes an image sensor and an optical element provided in front of an imaging surface of the image sensor.

3. The image sensing apparatus according to claim 1, wherein the optical axis moving amount acquisition unit further acquires a variation that is a range of variations in the position of the optical axis during exposure at the time of ordinary shooting.

4. An image processing apparatus for performing image processing on image data that has been generated by the image sensing apparatus according to claim 1 and that is associated with a moving amount of an optical axis at the time of shooting using a camera shake correction function, the image processing apparatus comprising:

a dust region specification unit configured to identify a dust region in the image data based on dust correction data and the moving amount of the optical axis at the time of shooting of the image data; and a dust reduction unit configured to perform dust reduction by performing correction processing on the dust region identified by the dust region specification unit.

5. The image processing apparatus according to claim 4, wherein the dust region specification unit identifies a dust region based on a variation that is a range of variations in the position of the optical axis during exposure, the variation being associated with the image data.

6. The image processing apparatus according to claim 4, wherein the dust reduction unit applies the dust reduction in a case where an aperture value at the time of shooting of the image data is greater than or equal to a preset value.

7. The image processing apparatus according to claim 5, wherein the dust reduction unit applies the dust reduction in a case where the variation in the optical axis is smaller than a preset value.

8. The image processing apparatus according to claim 4, wherein the image sensing apparatus comprises:

an optical axis moving amount acquisition unit configured to acquire a moving amount of the optical axis at the time of shooting;

a dust pixel determination unit configured to scan image data acquired by pre-shooting, during which the camera shake correction function is disabled, and determine a dust pixel corresponding to dust that is adhered to an imaging sensing device;

a dust correction data generation unit configured to generate dust correction data based on information about the dust pixel determined by the dust pixel determination unit; and a holding unit configured to hold the moving amount of the optical axis acquired by the optical axis moving amount acquisition unit and the dust correction data generated by the dust correction data generation unit.

9. A method for controlling an image sensing apparatus that has a camera shake correction function of moving an optical axis of an image sensing device, the method comprising:

an optical axis moving amount acquisition step in which an optical axis moving amount acquisition unit of the image sensing apparatus acquires a moving amount of the optical axis at the time of shooting;

a dust pixel determination step in which a dust pixel determination unit of the image sensing apparatus scans image data acquired by pre-shooting, during which the camera shake correction function is disabled, and determines a dust pixel corresponding to dust that is adhered to the image sensing device;

a dust correction data generation step in which a dust correction data generation unit of the image sensing apparatus generates dust correction data based on information about the dust pixel determined in the dust pixel determination step; and a holding step in which a holding unit of the image sensing apparatus holds the moving amount of the optical axis acquired in the optical axis moving amount acquisition step and the dust correction data generated in the dust correction data generation step, wherein the optical axis moving amount acquisition step is a step of acquiring a moving amount that is a difference in position between the optical axis at the time of pre-shooting and the optical axis at the time of ordinary shooting, during which the camera shake correction function is enabled, and wherein the holding step is a step of holding the moving amount of the optical axis and image data obtained at the time of ordinary shooting in association with each other.

10. A method for controlling an image processing apparatus that performs image processing on image data that is generated by an image sensing apparatus and that is associated with a moving amount of an optical axis at the time of shooting using a camera shake correction function, the method comprising:

a dust region specification step in which a dust region specification unit of the image processing apparatus identifies a dust region in the image data based on the moving amount of the optical axis at the time of shooting of the image data and dust correction data; and a dust reduction step in which a dust reduction unit of the image processing apparatus performs dust reduction by performing correction processing on the dust region identified in the dust region specification step.

11. A non-transitory computer-readable medium storing a program that causes a computer to serve as:

a dust region specification unit configured to identify a dust region in image data based on a moving amount of an optical axis at the time of shooting of the image data and dust correction data; and a dust reduction unit configured to perform dust reduction by performing correction processing on the dust region identified by the dust region specification unit.

12. An image sensing apparatus having a camera shake correction function of moving an optical axis of an image sensing device, the apparatus comprising:

an optical axis moving amount acquisition unit configured to acquire a moving amount of the optical axis when image being shot;

a dust correction data acquisition unit configured to acquire dust correction data based on information about a dust pixel corresponding to dust that is adhered to the image sensing device; and a holding unit configured to hold the moving amount of the optical axis acquired by the optical axis moving amount acquisition unit and the dust correction data acquired by the dust correction data acquisition unit, wherein the dust correction data acquisition unit acquires the dust correction data from image data shot without performing the camera shake correction function, and wherein the holding unit holds the moving amount of the optical axis and image data in association with each other.

13. An image processing apparatus for performing image processing on image data that is associated with a moving amount of the optical axis and dust correction data, the image processing apparatus comprising:

a dust region specification unit configured to identify a dust region in the image data based on the dust correction data and the moving amount of the optical axis; and a dust reduction unit configured to perform dust reduction by performing correction processing on the dust region identified by the dust region specification unit.

14. A method for controlling an image sensing apparatus that has a camera shake correction function of moving an optical axis of an image sensing device, the method comprising:

acquiring a moving amount of the optical axis when image being shot;

acquiring dust correction data based on information about a dust pixel corresponding to dust that is adhered to the image sensing device; and holding the moving amount of the optical axis acquired by the optical axis moving amount acquiring and the dust correction data acquired by the dust correction data acquiring, wherein the dust correction data is acquired from image data shot without performing the camera shake correction function, and wherein the moving amount of the optical axis and image data are held in association with each other.

15. A method for controlling an image processing apparatus for performing image processing on image data that is associated with a moving amount of the optical axis and dust correction data, the method comprising:

identifying, in a dust region specification unit of the image processing apparatus, a dust region in the image data based on the dust correction data and the moving amount of the optical axis; and performing, in a dust reduction unit of the image processing apparatus, dust reduction by performing correction processing on the dust region identified.

16. A non-transitory computer-readable medium storing a program that causes a computer to execute a method for controlling an imaging apparatus that includes an image sensing apparatus that has a camera shake correction function of moving an optical axis of an image sensing device, the method comprising:

acquiring a moving amount of the optical axis when image being shot;

acquiring dust correction data based on information about a dust pixel corresponding to dust that is adhered to the image sensing device; and holding the moving amount of the optical axis acquired by the optical axis moving amount acquiring and the dust correction data acquired by the dust correction data acquiring, wherein the dust correction data is acquired from image data shot without performing the camera shake correction function, and wherein the moving amount of the optical axis and image data are held in association with each other.

17. A non-transitory computer-readable medium storing a program that causes a computer to execute a method for controlling an image processing apparatus for performing image processing on image data that is associated with a moving amount of the optical axis and dust correction data, the method comprising:

identifying a dust region in the image data based on the dust correction data and the moving amount of the optical axis; and performing dust reduction by performing correction processing on the dust region identified.

* * * * *